United States Patent
Yu et al.

(10) Patent No.: US 12,316,208 B2
(45) Date of Patent: May 27, 2025

(54) THREE-LEVEL DIRECT CURRENT CONVERTER, POWER SUPPLY SYSTEM, AND CHIP

(71) Applicant: HUAWEI TECHNOLOGIES CO., LTD., Guangdong (CN)

(72) Inventors: Guolei Yu, Dongguan (CN); Shuchao Song, Hangzhou (CN); Junliang Qin, Dongguan (CN); Zhiqiang Xiang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 490 days.

(21) Appl. No.: 17/876,419

(22) Filed: Jul. 28, 2022

(65) Prior Publication Data

US 2023/0029565 A1 Feb. 2, 2023

(30) Foreign Application Priority Data

Jul. 30, 2021 (CN) .......................... 202110872542.8

(51) Int. Cl.
| | |
|---|---|
| *H02M 3/158* | (2006.01) |
| *H02M 1/00* | (2006.01) |
| *H02M 1/08* | (2006.01) |
| *H02M 1/14* | (2006.01) |
| *H02M 3/07* | (2006.01) |

(52) U.S. Cl.
CPC ........... *H02M 1/0095* (2021.05); *H02M 1/08* (2013.01); *H02M 1/14* (2013.01); *H02M 3/07* (2013.01); *H02M 3/158* (2013.01); *H02M 1/007* (2021.05)

(58) Field of Classification Search
CPC ........ H02M 1/0095; H02M 1/08; H02M 1/14; H02M 1/007; H02M 3/158; H02M 3/07
See application file for complete search history.

(56) References Cited

U.S. PATENT DOCUMENTS

| | | | |
|---|---|---|---|
| 9,866,113 B1 * | 1/2018 | Assaad | H02M 3/158 |
| 10,090,763 B1 * | 10/2018 | Mercer | H02M 3/158 |
| 11,108,325 B2 * | 8/2021 | Mahmoudidaryan | H02M 3/158 |
| 2016/0329810 A1 * | 11/2016 | Lee | H02M 3/158 |
| 2019/0058397 A1 * | 2/2019 | Lazaro | H02M 3/158 |

* cited by examiner

*Primary Examiner* — Kyle J Moody
*Assistant Examiner* — Jye-June Lee
(74) *Attorney, Agent, or Firm* — WOMBLE BOND DICKINSON (US) LLP

(57) ABSTRACT

The three-level direct current converter includes: a flying capacitor, a plurality of switch groups, a drive circuit, and a control circuit. The control circuit includes at least an on-time generator. When a voltage on the flying capacitor deviates from a half of a power supply voltage, the on-time generator changes a charging current of a capacitor of the on-time generator to adjust an output on-time signal, and outputs the on-time signal to the drive circuit. The drive circuit generates a drive pulse signal based on the on-time signal to drive switch statuses of the plurality of switch groups, to adjust charging time and discharging time of the flying capacitor, where an absolute value of a difference between the voltage on the flying capacitor and the half of the power supply voltage is less than or equal to a preset threshold.

19 Claims, 11 Drawing Sheets

THREE-LEVEL DIRECT CURRENT CONVERTER, POWER SUPPLY SYSTEM, AND CHIP

CROSS-REFERENCE TO RELATED APPLICATIONS

This application claims priority to Chinese Patent Application No. 202110872542.8, filed on Jul. 30, 2021, which is hereby incorporated by reference in its entirety.

TECHNICAL FIELD

This application relates to the field of power electronic technologies, and in particular, to a three-level direct current converter, a power system, and a chip.

BACKGROUND

A direct current (DC)/direct current converter is a switch-mode power supply converter commonly used in an electronic system, and is configured to perform direct current-direct current conversion, and may perform boost conversion or buck conversion.

The DC/DC converter may be classified into a two-level topology and a multi-level topology based on a level status of a switch point. A switch point level of the two-level topology includes two types: 0 and an input voltage, and the multi-level topology includes more than two types of levels. Currently, a commonly used DC/DC converter is a flying capacitor-clamped three-level direct current converter, which is briefly referred to as a direct current converter with a flying capacitor. Half of an input voltage is stored by using a flying capacitor, so that a switch point voltage includes 0, ½ input voltage, and an input voltage. A change amplitude of the switch point voltage is half of the two-level topology. In this way, a switching transistor with a low withstand voltage can be used to improve performance of an electronic system.

The direct current converter with the flying capacitor includes a flying capacitor, and further includes at least four switch groups sequentially connected in series: a first switch group, a second switch group, a third switch group, and a fourth switch group. A voltage on the flying capacitor in the direct current converter with the flying capacitor needs to be maintained at a half of a power supply voltage. Otherwise, a voltage at a switch point when the first switch group and the third switch group are turned on is different from a voltage at a switch point when the second switch group and the fourth switch group are turned on. Consequently, a ripple current of an inductor in a circuit increases, and an additional power loss is caused.

SUMMARY

To resolve the foregoing technical problem, this application provides a three-level direct current converter, a power system, and a chip, to reduce a ripple current of an inductor in a circuit, thereby reducing an additional power loss.

An embodiment of this application provides a three-level direct current converter, including: a flying capacitor, a plurality of switch groups, a drive circuit, and a control circuit. The on-time generator adjusts an on-time signal output by the on-time generator by changing a charging current of a capacitor of the on-time generator when a voltage on the flying capacitor deviates from a half of a power supply voltage, where the on-time signal corresponds to turn-on time and turn-off time of a plurality of switching transistors. The drive circuit generates a drive pulse signal based on the on-time signal to drive switch statuses of the plurality of switch groups, to adjust charging time and discharging time of the flying capacitor, so that an absolute value of a difference between a voltage on the flying capacitor and the half of the power supply voltage is less than or equal to a preset threshold. In other words, the voltage on the flying capacitor is the half of the power supply voltage. A smaller value of the preset threshold indicates that the voltage on the flying capacitor is closer to the half of the power supply voltage.

It can be learned that, according to the direct current converter provided in this embodiment of this application, the half of the power supply voltage is compared with the voltage on the flying capacitor, and when the voltage on the flying capacitor deviates from the half of the power supply voltage, a value of the charging current of the capacitor of the on-time generator is adjusted, to adjust the on-time signal output by the on-time generator. The control circuit controls on-time of the plurality of switch groups based on the on-time signal output by the on-time generator, that is, controls lengths of the on-time of the plurality of switch groups, to adjust charging time of the flying capacitor and discharging time of the flying capacitor. When the charging time and the discharging time of the flying capacitor are changed, the voltage on the flying voltage is changed, and finally the voltage on the flying capacitor is maintained at the half of the power supply voltage. This can ensure that a voltage at a switch point of the direct current converter is stable, so that a ripple current on an inductor connected to the switch point is small, and an additional loss caused by the ripple current on the inductor can be reduced. In addition, in this embodiment of this application, a magnitude of the voltage on the flying capacitor can be adjusted only by changing the charging current of the on-time generator. The solution is simple and easy to implement.

In one embodiment, the plurality of switch groups provided in this embodiment of this application include a first switch group, a second switch group, a third switch group, and a fourth switch group. The on-time generator is configured to output a first on-time signal to the first switch group, and is further configured to output a second on-time signal to the second switch group. In a continuous conduction mode, a switch status of the fourth switch group complements a switch status of the first switch group, and a switch status of the third switch group complements a switch status of the second switch group. In each switch period of the four switch groups, a sum of an on-time of the first switch group and an on-time of the second switch group is within a preset time range. It can be learned that, in this embodiment of this application, when the voltage on the flying capacitor is adjusted by using first on-time and second on-time, it is ensured that a sum of the first on-time and the second on-time is basically fixed. In other words, an increased value of the first on-time is equal to a decreased value of the second on-time, or an increased value of the second on-time is equal to a decreased value of the first on-time. Therefore, the on-time generator provided in this embodiment of this application can keep the voltage on the flying capacitor stable at the half of the power supply voltage while reducing fluctuation of an output voltage.

In one embodiment, the control circuit provided in this embodiment of this application further includes an error amplifier, an on-time distributor, and a charging current control circuit. The on-time generator includes a first on-time generator and a second on-time generator. Two input ends of the error amplifier are respectively connected to an output voltage of the direct current converter and a preset voltage, and are configured to output an error signal based on a difference between the output voltage of the direct current converter and the preset voltage. The on-time distributor is configured to output a first enable signal of the first on-time generator and a second enable signal of the second on-time generator based on the error signal. The charging current control circuit is configured to compare the voltage on the flying capacitor with the half of the power supply voltage, and generate a first charging current of the first on-time generator and a second charging current of the second on-time generator based on a comparison result. A sum of the first charging current and the second charging current is within a preset current range. For example, when the voltage on the flying capacitor is greater than the half of the power supply voltage, the first charging current increases, and a voltage at a positive input end of a comparator in the first on-time generator increases rapidly. Consequently, the first on-time becomes shorter, and the on-time of the first switch group becomes shorter. In other words, charging time of the flying capacitor becomes shorter. Correspondingly, a second charging current becomes smaller, and a voltage at a positive input end of a comparator in the second on-time generator increases slowly. Consequently, the second on-time becomes longer, and on-time of the second switch group becomes longer. In other words, discharging time of the flying capacitor becomes longer. The charging time of the flying capacitor becomes longer, and the discharging time becomes shorter. Consequently, the voltage on the flying capacitor becomes smaller, and is equal to the half of the power supply voltage. In addition, because the sum of the first charging current and the second charging current is equal to a constant current, the sum of the first on-time and the second on-time is basically fixed. Therefore, the output voltage is slightly affected in a process in which the first charging current and the second charging current change.

In one embodiment, the charging current control circuit provided in this embodiment of this application includes a first PMOS transistor and a second PMOS transistor. A source electrode of the first PMOS transistor is connected to a first constant current source, and a source electrode of the second PMOS transistor is connected to the first constant current source. A gate electrode of the first PMOS transistor is biased to the half of the power supply voltage, and a gate electrode of the second PMOS transistor is biased to the voltage on the flying capacitor. A drain electrode of the first PMOS transistor generates the first charging current and outputs the first charging current to the first on-time generator, and a drain electrode of the second PMOS transistor generates the second charging current and outputs the second charging current to the second on-time generator.

In one embodiment, the control circuit provided in this embodiment of this application further includes an on-time distributor. The on-time distributor is configured to separate a first on-time signal and a second on-time signal for the drive circuit based on the on-time signal output by the on-time generator. The first on-time signal corresponds to the first switch group, and the second on-time signal corresponds to the second switch group. In a continuous conduction mode, a switch status of the fourth switch group complements a switch status of the first switch group, and a switch status of a third switch group complements a switch status of the second switch group. In each switch period of the four switch groups, a sum of on-time of the first switch group and on-time of the second switch group is within a preset time range. It should be understood that, a period of the on-time signal is, a waveform of the on-time signal in a first period is the same as a waveform of the first on-time signal in the first period, and a waveform of the on-time signal in a second period is the same as a waveform of the second on-time signal in the second period. The first on-time plus the second on-time is equal to on-time.

In one embodiment, the control circuit provided in this embodiment of this application further includes an error amplifier and a charging current control circuit. Two input ends of the error amplifier are respectively connected to an output voltage of the direct current converter and a preset voltage, and are configured to output an error signal based on a difference between the voltage on the flying capacitor and the preset voltage. The charging current control circuit is configured to compare the voltage on the flying capacitor with the half of the power supply voltage, and generate the charging current of the on-time generator based on a comparison result and two complementary signals output by a D flip-flop in the on-time distributor. It can be learned that, the on-time generator of the direct current converter provided in this embodiment of this application is connected to the error amplifier through a pulse generator. The on-time generator directly generates comprehensive on-time based on a signal output by the pulse generator, and outputs the comprehensive on-time to the on-time distributor. Then, the on-time distributor separates the first on-time and the second on-time based on the comprehensive on-time to control the four switch groups, to maintain the voltage on the flying capacitor at the half of the power supply voltage. In this way, the voltage at the switch point of the direct current converter provided in this embodiment of this application is stable, the ripple current of the inductor is reduced, and the additional loss caused by the ripple current is reduced.

In one embodiment, the charging current control circuit provided in this embodiment of this application includes a third PMOS transistor, a fourth PMOS transistor, a first switching transistor, and a second switching transistor. Both a source electrode of the third PMOS transistor and a source electrode of the fourth PMOS transistor are connected to a second constant current source, a gate electrode of the third PMOS transistor is biased to the half of the power supply voltage, and a gate electrode of the fourth PMOS transistor is biased to the voltage on the flying capacitor. A drain electrode of the third PMOS transistor is connected to a first end of the first switching transistor, a drain electrode of the fourth PMOS transistor is connected to a first end of the second switching transistor, and a second end of the first switching transistor and a second end of the second switching transistor are connected together to output the charging current. A first output end of the D flip-flop is connected to a control end of the first switching transistor, and a second output end of the D flip-flop is connected to a control end of the second switching transistor.

In one embodiment, both the first switching transistor and the second switching transistor provided in this embodiment of this application are NMOS transistors.

In one embodiment, that a sum of on-time of the first switch group and on-time of the second switch group is within a preset time range includes: The on-time of the first switch group changes by first time, and the on-time of the second switch group reversely changes by the first time.

In one embodiment, that a voltage on the flying capacitor deviates from a half of a power supply voltage provided in this embodiment of this application includes: the absolute value of the difference between the voltage on the flying capacitor and the half of the power supply voltage is greater than the preset threshold.

According to the three-level direct current converter provided in the foregoing embodiment, an embodiment of this application further provides a power system, including the direct current converter in the foregoing embodiments, and further including a rectifier and a buck converter. An input end of the rectifier is configured to connect to an alternating current power supply. An output end of the rectifier is connected to an input end of the buck converter. An output end of the buck converter is connected to an input end of the direct current converter.

In one embodiment, the buck converter provided in this embodiment of this application is an open-loop buck converter.

In one embodiment, an input voltage of the buck converter provided in this embodiment of this application is 48 V, an output voltage of the buck converter is 12 V, and an output voltage of the direct current converter supplies power to the chip.

According to the three-level direct current converter and the power supply system provided in the foregoing embodiment, an embodiment of this application further provides a drive chip of the three-level direct current converter, including a drive circuit and a control circuit, configured to drive the three-level direct current converter. The three-level converter includes a flying capacitor and a plurality of switch groups. The control circuit includes at least an on-time generator. The on-time generator is configured to adjust on-time output by the on-time generator by changing a charging current of a capacitor of the on-time generator when a voltage on the flying capacitor deviates from a half of a power supply voltage. The on-time output is output to the drive circuit. The drive circuit is configured to generate a drive pulse signal based on the on-time output to drive switch statuses of the plurality of switch groups, to adjust charging time and discharging time of the flying capacitor, so that an absolute value of a difference between a voltage on the flying capacitor and the half of the power supply voltage is less than or equal to a preset threshold.

In one embodiment, the plurality of switch groups provided in this embodiment of this application include a first switch group, a second switch group, a third switch group, and a fourth switch group. The on-time generator is configured to output a first on-time signal to the first switch group, and is further configured to output a second on-time signal to the second switch group. In a continuous conduction mode, a switch status of the fourth switch group complements a switch status of the first switch group, and a switch status of the third switch group complements a switch status of the second switch group. In each switch period of the four switch groups, a sum of first on-time and second on-time is within a preset time range.

In one embodiment, the control circuit provided in this embodiment of this application further includes an error amplifier, an on-time distributor, and a charging current control circuit. An on-time generator control circuit includes a first on-time generator and a second on-time generator. Two input ends of the error amplifier are respectively connected to an output voltage of the direct current converter and a preset voltage, and are configured to output an error signal based on a difference between the output voltage of the direct current converter and the preset voltage. The on-time distributor is configured to output a first enable signal of the first on-time generator and a second enable signal of the second on-time generator based on the error signal. The charging current control circuit is configured to compare the voltage on the flying capacitor with the half of the power supply voltage, and generate a first charging current of the first on-time generator and a second charging current of the second on-time generator based on a comparison result. A sum of the first charging current and the second charging current is within a preset current range.

In one embodiment, the control circuit provided in this embodiment of this application further includes an on-time distributor. The on-time distributor is configured to separate a first on-time signal and a second on-time signal for the drive circuit based on the on-time signal output by the on-time generator. The first on-time signal corresponds to the first switch group, and the second on-time signal corresponds to the second switch group. In a continuous conduction mode, a switch status of the fourth switch group complements a switch status of the first switch group, and a switch status of a third switch group complements a switch status of the second switch group. In each switch period of the four switch groups, a sum of on-time of the first switch group and on-time of the second switch group is within a preset time range.

In one embodiment, the control circuit provided in this embodiment of this application further includes an error amplifier and a charging current control circuit. Two input ends of the error amplifier are respectively connected to an output voltage of the direct current converter and a preset voltage, and are configured to output an error signal based on a difference between the voltage on the flying capacitor and the preset voltage. The charging current control circuit is configured to compare the voltage on the flying capacitor with the half of the power supply voltage, and generate the charging current of the on-time generator based on a comparison result and two complementary signals output by a D flip-flop in the on-time distributor.

This application has at least the following advantages.

According to the direct current converter provided in this embodiment of this application, the half of the power supply voltage is compared with the voltage on the flying capacitor, and when the voltage on the flying capacitor deviates from the half of the power supply voltage, a value of the charging current of the capacitor of the on-time generator is adjusted, to adjust the on-time signal output by the on-time generator. The control circuit controls on-time of the plurality of switch groups based on the on-time signal output by the on-time generator, that is, controls lengths of the on-time of the plurality of switch groups, to adjust charging time of the flying capacitor and discharging time of the flying capacitor. When the charging time and the discharging time of the flying capacitor are changed, the voltage on the flying voltage is changed, and finally the voltage on the flying capacitor is maintained at the half of the power supply voltage. This can ensure that a voltage at a switch point of the direct current converter is stable, so that a ripple current on an inductor connected to the switch point is small, and an additional loss caused by the ripple current on the inductor can be reduced. In addition, in this embodiment of this application, a magnitude of the voltage on the flying capacitor can be adjusted only by changing the charging current of the on-time generator. The solution is simple and easy to implement.

DESCRIPTION OF EMBODIMENTS

Figure 1:
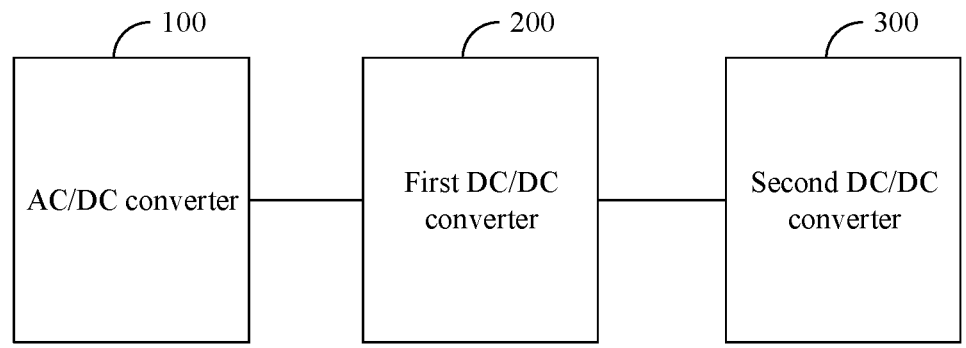
FIG. 1 is a schematic diagram of a power system according to an embodiment of this application.

The following describes the technical solutions in embodiments of this application with reference to accompanying drawings in embodiments of this application.

The following terms "first", "second", and the like are merely intended for a purpose of description, and shall not be understood as an indication or implication of relative importance or implicit indication of a quantity of indicated technical features. Therefore, a feature limited by "first", "second", or the like may explicitly or implicitly include one or more features. In the descriptions of this application, unless otherwise stated, "a plurality of" means two or more than two.

In this application, a term "connection" should be understood in a broad sense unless otherwise expressly specified and limited. For example, the "connection" may be a fixed connection, may be a detachable connection, may be an integral connection, may be a direct connection, or may be an indirect connection implemented by using a medium. In addition, a term "coupling" may be a manner of implementing an electrical connection for signal transmission. The "coupling" may be a direct electrical connection, or may be an indirect electrical connection through an intermediate medium.

Embodiments of this application relate to a three-level direct current converter, configured to perform direct current-direct current electric energy conversion, for example, boost conversion or buck conversion. This is not limited in embodiments of this application. In addition, an application scenario of the three-level direct current converter is not limited in embodiments of this application. For example, the three-level direct current converter may be used in various application scenarios in which direct current-direct current conversion is required, such as a server, a communication base station, a photovoltaic device, and a terminal device. When the three-level direct current converter is used in a switch-mode power supply, the switch-mode power supply may be used in the terminal device, for example, a power adapter of the terminal device. The three-level direct current converter may convert an input voltage into a voltage required by a load. For example, the load may be a chip, a control circuit, or the like. A type of the terminal device is not limited in embodiments of this application. The terminal device may be a device such as a mobile phone, a tablet computer (pad), a computer, an intelligent wearable product (for example, a smartwatch, a smart band, or an earphone), a virtual reality (VR) terminal device, or an augmented reality (AR) terminal device.

To make a person skilled in the art better understand the technical solutions provided in embodiments of this application, the following first describes an application scenario of the three-level direct current converter provided in an embodiment of this application with reference to the accompanying drawings.

The following uses an example in which the three-level direct current converter provided in this embodiment of this application is used in a switch-mode power supply.

FIG. 1 is a schematic diagram of a power system according to an embodiment of this application.

As shown in FIG. 1, the power system provided in this embodiment of this application includes an alternating current (AC)/DC converter 100, a first DC/DC converter 200, and a second DC/DC converter 300.

Both the first DC/DC converter 200 and the second DC/DC converter 300 may be implemented by a three-level direct current converter provided in this embodiment of this application.

An input end of the AC/DC converter 100 is configured to connect to an alternating current power supply, for example, 220 V alternating current mains. An output end of the AC/DC converter 100 is connected to an input end of the first DC/DC converter 200. An output end of the first DC/DC converter 200 is connected to an input end of the second DC/DC converter 300. An output end of the second DC/DC converter 300 is configured to connect to a load.

In this embodiment, both the first DC/DC converter 200 and the second DC/DC converter 300 are buck converters, where the first DC/DC converter 200 is configured to receive an output voltage of the AC/DC converter 100, and buck and output the voltage to the second DC/DC converter 300. This may be implemented by using an open-loop control buck converter or a closed-loop control buck converter. The second DC/DC converter 300 is configured to receive an output voltage of the first DC/DC converter 200, and buck and output the voltage to the load. This may be implemented by using the closed-loop control buck converter.

A voltage output by the second DC/DC converter 300 is used to supply power to the load. Because the second DC/DC converter 300 can implement closed-loop control, the second DC/DC converter 300 has both a buck function and a voltage stabilization function, so that the output voltage of the second DC/DC converter 300 is stable and controllable.

In one embodiment, the AC/DC converter 100 provided in this embodiment of this application is configured to convert a 220 V alternating current into a 48 V direct current. The first DC/DC converter 200 is configured to convert the 48 V direct current into a 12 V direct current. The second DC/DC converter 300 is configured to continue to buck a voltage of the 12 V direct current, for example, to 5 V, 3.3 V, 1.2 V or the like to supply power to the load such as a chip.

It should be understood that the first DC/DC converter 200 provided in this embodiment of this application is only configured to buck an input voltage of 48 V to 12 V, and the output voltage of the first DC/DC converter 200 does not directly supply power to the chip or another load. Instead, the second DC/DC converter 300 further bucks and stabilizes the voltage. The voltage output by the second DC/DC converter 300 is more stable and accurate, meeting a power supply requirement of the load such as the chip.

The 12 V voltage output by the first DC/DC converter 200 provided in this embodiment may perform open-loop control. The output voltage is allowed to fluctuate within a range, as long as an input voltage range of the second DC/DC converter 300 is met. Therefore, the first DC/DC converter 200 of first-stage buck may be designed as an open-loop converter.

Correspondingly, the output voltage of the second DC/DC converter 300 provided in this embodiment of this application needs to meet a power supply requirement of the chip or another load, and provides an accurate and stable output voltage. To ensure that the output voltage is more stable and accurate, a voltage at the output end of the second DC/DC converter 300 may be detected and fed back to the input end of the second DC/DC converter 300, to perform closed-loop negative feedback control. In other words, the second DC/DC converter 300 provided in this embodiment of this application may perform closed-loop control, so that a voltage at the output end of the second DC/DC converter 300 is more stable. Therefore, the second DC/DC converter 300 of second-stage buck may be designed as a closed-loop converter.

The second DC/DC converter is implemented by using a direct current converter with a flying capacitor. The following describes a architecture of the direct current converter with the flying capacitor with reference to the accompanying drawings.

The direct current converter with the flying capacitor provided in this embodiment of this application includes a plurality of switch groups. Each switch group may include one controllable switch, or may include a plurality of controllable switches. The controllable switch provided in this embodiment of this application may be implemented through a metal-oxide semiconductor field-effect transistor (MOSFET), or may be implemented through an insulated gate bipolar transistor (IGBT) or a bipolar junction transistor (BJT). For ease of understanding the solutions provided in this embodiment of this application, the following uses an example in which the direct current converter includes four switch groups and each switch group includes one controllable switch.

Figure 2:
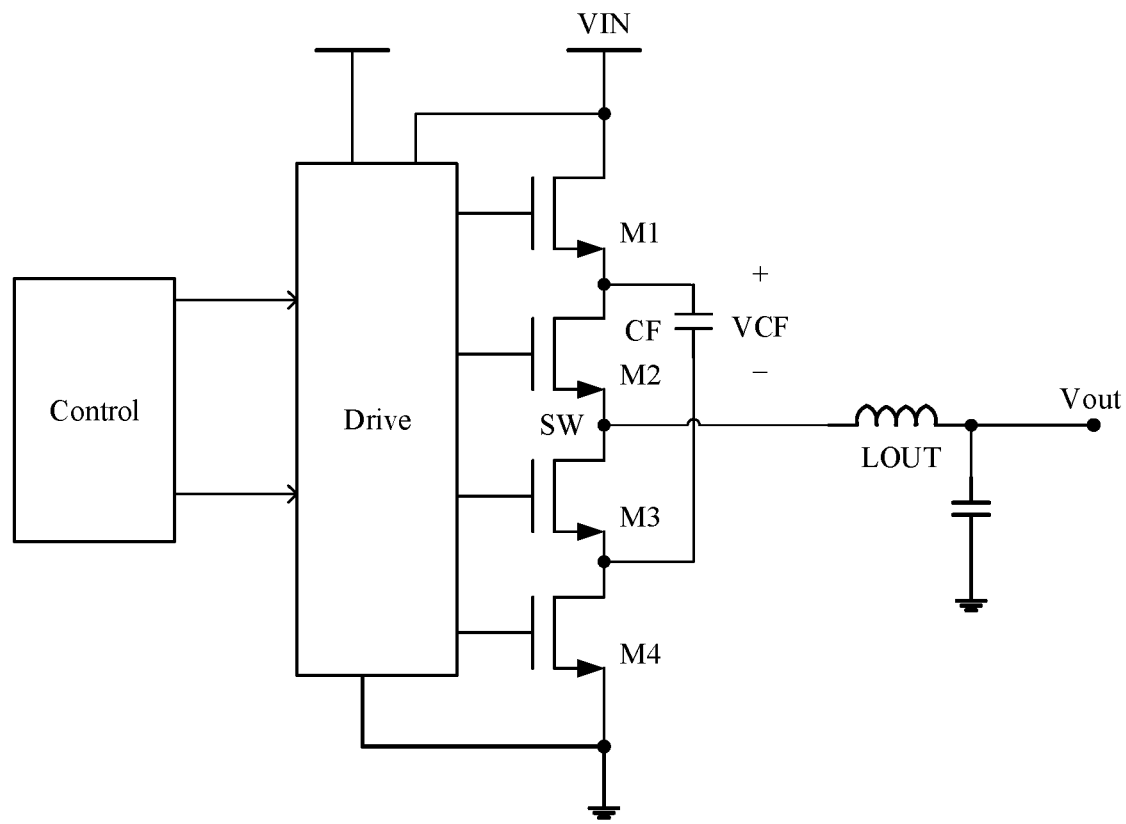
FIG. 2 is a schematic diagram of a drive part of a direct current converter with a flying capacitor according to an embodiment of this application.

FIG. 2 is a schematic diagram of a drive part of a direct current converter with a flying capacitor according to an embodiment of this application.

An embodiment of this application provides a flying capacitor-clamped three-level direct current converter, including a flying capacitor CF and a plurality of switch groups (a first switch group M1, a second switch group M2, a third switch group M3, and a fourth switch group M4).

As shown in FIG. 2, a first end of the first switch group M1 is connected to a power supply voltage VIN, a second end of the first switch group M1 is connected to a first end of the second switch group M2, a second end of the second switch group M2 is connected to a first end of the third switch group M3, a second end of the third switch group M3 is connected to a first end of the fourth switch group, and a second end of the fourth switch group is grounded.

A first end of the flying capacitor CF is connected between the first switch group M1 and the second switch group M2, a second end of the flying capacitor CF is connected between the third switch group M3 and the fourth switch group M4. A switch point SW is located between the second switch group M2 and the third switch group M3, and the switch point SW is configured to output an output voltage Vout through an inductor LOUT.

The first switch group M1 and the second switch group M2 in the direct current converter with the flying capacitor provided in this embodiment of this application alternately work when a system is in a stable state. In other words, a phase difference between a drive signal corresponding to the first switch group M1 and a drive signal corresponding to the second switch group M2 is a half of a drive signal period. Correspondingly, the third switch group M3 and the fourth switch group M4 also work alternately, and a phase difference between a drive signal corresponding to the third switch group M3 and a drive signal corresponding to the fourth switch group M4 is the half of the drive signal period.

Switch statuses of the first switch group M1 and the fourth switch group M4 are complementary: In other words, when the first switch group M1 is turned on, the fourth switch group M4 is turned off, and when the first switch group M1 is turned off, the fourth switch group M4 is turned on. Switch statuses of the second switch group M2 and the third switch group M3 are complementary: The third switch group M3 is turned off when the second switch group M2 is turned on, and the third switch group M3 is turned on when the second switch group M2 is turned off.

When the direct current converter with the flying capacitor normally works, a voltage VCF on the flying capacitor CF should be equal to a half of a supply voltage VIN, that is, ½ VIN. If the voltage VCF deviates from ½ VIN, when the first switch group M1 and the third switch group M3 are turned on, and when the second switch group M2 and the fourth switch group are turned on, a voltage of the switch point SW deviates, thereby causing a ripple current of the inductor LOUT to increase, and causing an additional loss. In addition, a voltage stress greater than ½ VIN is generated on a switch group, and a power transistor with a higher withstand voltage needs to be used.

An embodiment of this application provides a direct current converter with a flying capacitor. On-time output by a capacitor of an on-time generator (TON Generator) is adjusted by changing a charging current of the capacitor, and the on-time output is output to a drive circuit, to maintain the voltage VCF of the flying capacitor CF at ½ VIN, so that the voltage of the switch point SW is stable, the ripple current of the inductor LOUT is reduced, and the additional loss caused by the ripple current is reduced. In addition, the voltage stress of the switch group is maintained around ½ VIN, and the power transistor with the higher withstand voltage does not need to be used. The capacitor is a capacitor inside the on-time generator.

With reference to the accompanying drawings, the following continues to describe, by using a direct current converter including four switch groups as an example, a direct current converter that is provided in an embodiment of this application and that has a flying capacitor and that includes an on-time generator.

Figure 3:
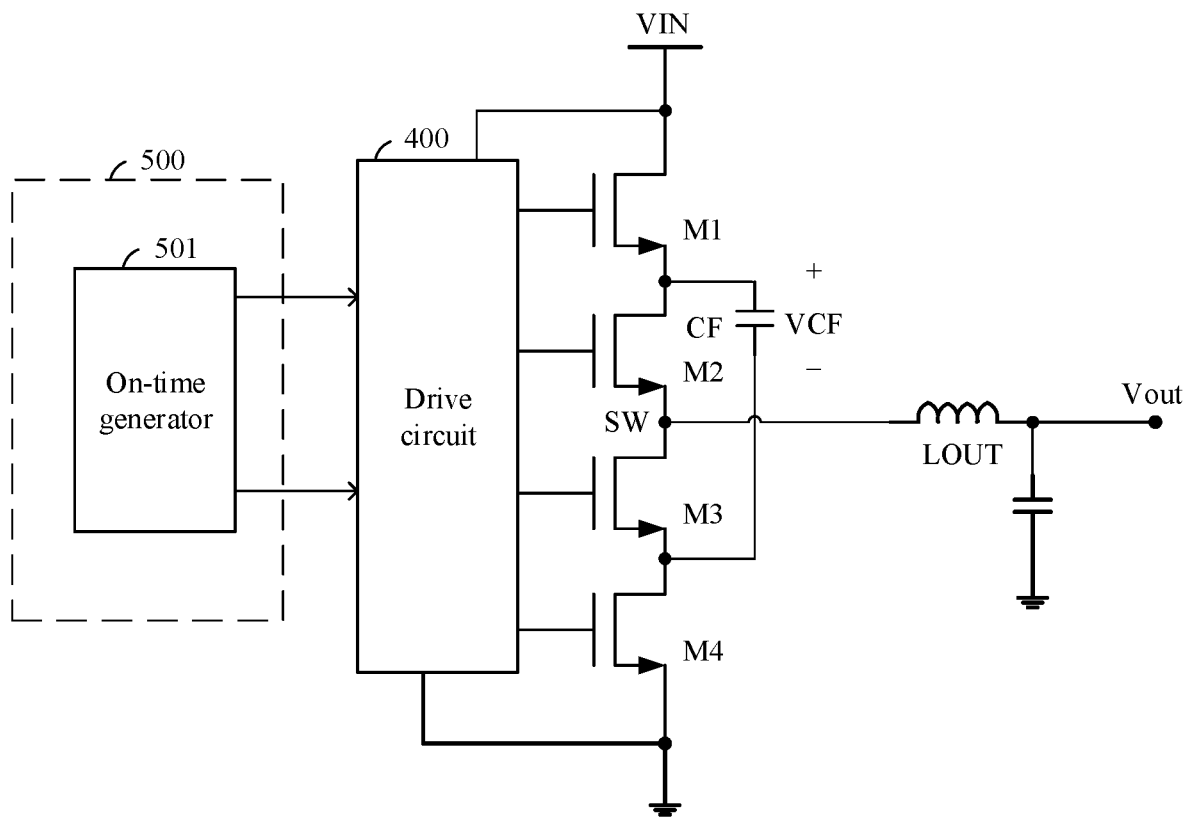
FIG. 3 is a schematic diagram of a three-level direct current converter according to an embodiment of this application.

FIG. 3 is a schematic diagram of a three-level direct current converter according to an embodiment of this application.

As shown in FIG. 3, a three-level direct current converter provided in this embodiment of this application includes a flying capacitor CF, a drive circuit 400, and a control circuit 500. The control circuit 500 includes at least an on-time generator 501. The three-level direct current converter further includes the following at least four switch groups that are sequentially connected in series: a first switch group M1, a second switch group M2, a third switch group M3, and a fourth switch group M4. Structures and relationships of the four switch groups are the same as those in FIG. 2. Details are not described herein again.

The on-time generator 501 is configured to: when a voltage VCF on the flying capacitor CF deviates from ½ VIN, change a charging current of an internal capacitor to adjust an output on-time signal, where the on-time signal is output to the drive circuit 400.

The drive circuit 400 is configured to generate a drive pulse signal based on the on-time signal to drive a plurality of switch groups, that is, change switch statuses of the first switch group M1, the second switch group M2, the third switch group M3, and the fourth switch group M4, to adjust charging time and discharging time of the flying capacitor CF, so that an absolute value of a difference between the voltage VCF on the flying capacitor CF and the ½ VIN is less than or equal to a preset threshold.

It should be noted that in this embodiment of this application, the difference between the VCF and the ½ VIN may be positive or negative. In other words, the VCF may be greater than the ½ VIN, or the VCF may be less than the ½ VIN. The absolute value of the difference between the voltage VCF on the flying capacitor CF and the ½ VIN is less than or equal to the preset threshold. In other words, in an actual application, there may be a particular difference between the VCF and the ½ VIN. The preset threshold may be selected based on the actual precision required by the direct current converter for the VCF. A smaller preset threshold indicates a smaller difference between the VCF and the ½ VIN. The VCF being closer to the ½ VIN indicates more precise controlling of the VCF by the direct current converter. For ease of description, the voltage VCF on the flying capacitor CF is basically the same as the ½ VIN.

The voltage VCF on the flying capacitor CF may be obtained by using a voltage sampling circuit. To facilitate a next-stage circuit to process a voltage signal, a voltage signal proportional to the VCF may be collected. In other words, the voltage signal may represent a value of the VCF. An entity for implementing the VCF and the ½ VIN is not limited in this embodiment of this application either. For example, the VCF and the ½ VIN may be implemented by an analog circuit, or may be implemented by a chip.

A magnitude of the charging current provided in this embodiment of this application may be determined based on a degree to which the voltage VCF on the flying capacitor CF deviates from the power supply voltage ½ VIN. An input end of the on-time generator 501 provided in this embodiment of this application may be connected to the charging current. When the charging current changes, the on-time signal output by the on-time generator 501 also changes, a duty cycle of a drive signal output by the drive circuit also changes, and switch statuses of the four switch groups M1 to M4 change. In other words, on time and off time change, thereby affecting charging time and discharging time of the flying capacitor CF and affecting the voltage on the CF. The voltage VCF on the flying capacitor CF is stabilized at the ½ VIN. In one embodiment of this application, the charging current of the on-time generator that is used as an example for description in the following may be negatively correlated with on-time output by the on-time generator. In other words, when the charging current increases, time in which an on-time signal is high becomes shorter. In one embodiment, the charging current of the on-time generator may also be positively correlated with the on-time output by the on-time generator. In other words, when the charging current increases, the time in which the on-time signal is high becomes longer. This is not limited in this embodiment of this application.

The following describes a working principle of the on-time generator provided in an embodiment of this application with reference to the accompanying drawings.

Figure 4:
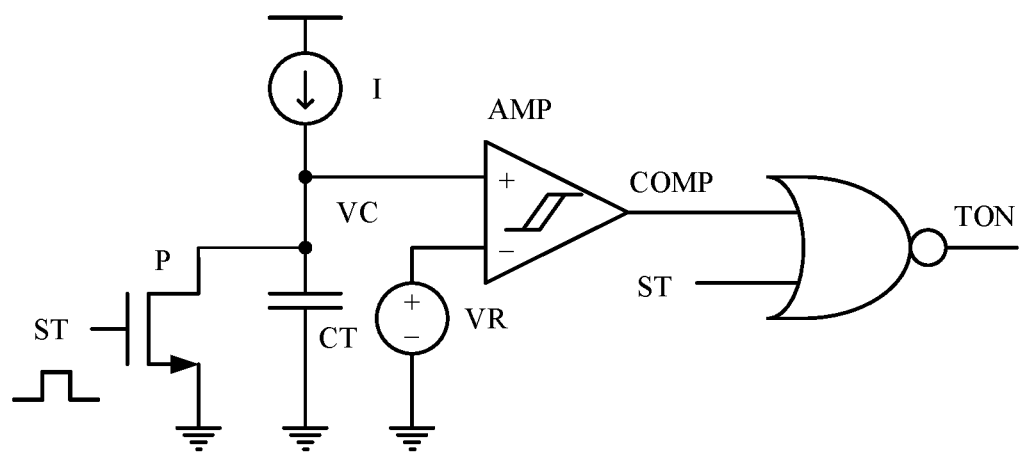
FIG. 4 is a schematic diagram of an on-time generator according to an embodiment of this application.

FIG. 4 is a schematic diagram of an on-time generator according to an embodiment of this application.

Figure 5:
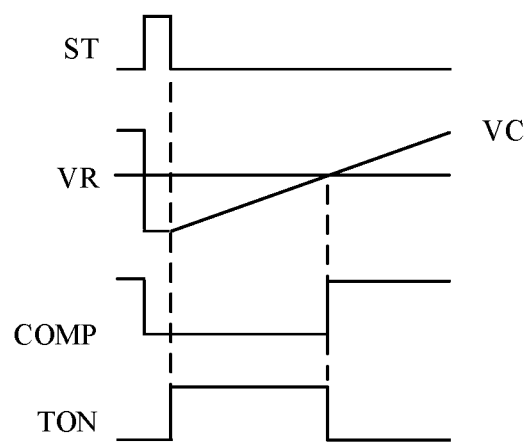
FIG. 5 is a waveform time sequence diagram of an on-time generator according to an embodiment of this application.

FIG. 5 is a waveform time sequence diagram of an on-time generator according to an embodiment of this application.

The on-time generator provided in this embodiment of this application includes a switch P, a capacitor CT, a constant voltage source VR, and a comparator AMP. A capacitor CT in FIG. 4 is an internal capacitor of the on-time generator. A technical solution provided in this embodiment of this application is to change a charging current I of the capacitor CT to change on-time output by the on-time generator. In one embodiment, this may be determined based on a degree to which a voltage VCF on a flying capacitor CF deviates from ½ VIN.

When an enable signal ST has one pulse signal, the switch P is turned on, and the capacitor CT is discharged. As shown in FIG. 5, at this time, a voltage at a VC point is 0 V. Because the voltage VC, that is, 0 V, at a positive input end of the comparator AMP is less than a voltage VR at a negative input end of the comparator AMP, an output voltage COMP of the comparator AMP is a low level. The output voltage of the comparator AMP and the enable signal output an on-time signal TON through a NOR gate. At this time, the enable signal changes to a low level after passing through a pulse, the output voltage COMP of the comparator AMP also changes to a low level, and the on-time signal TON output by the on-time generator changes from a low level to a high level.

When a pulse signal of the enable signal ST ends, the switch P is turned off, and the charging current I starts to charge the capacitor CT. As shown in FIG. 5, a voltage at both ends of the capacitor C starts to boost. In other words, the voltage VC starts to boost, and a boost speed is proportional to a magnitude of the charging current I. When the voltage VC is greater than or equal to the constant voltage VR, the output voltage COMP of the comparator AMP is a high level, and the on-time signal TON output by the on-time generator changes from a high level to a low level.

In one embodiment, when a first switch group M1 and a third switch group M3 are turned on, a power supply voltage VIN discharges the flying capacitor when the flying capacitor is being charged. When a second switch group M2 and a fourth switch group M4 are turned on, the flying capacitor discharges. According to a drive circuit 400 provided in this embodiment of this application, when the voltage VCF on the flying capacitor is less than the ½ VIN, on-time of the first switch group M1 and the third switch group M3 is prolonged, and/or on-time of the second switch group M2 and the fourth switch group M4 is reduced based on the on-time, so that the voltage VCF on the flying capacitor boosts, to be consistent with the ½ VIN. Correspondingly, when the voltage VCF on the flying capacitor is greater than the ½ VIN, the on-time of the first switch group M1 and the third switch group M3 is reduced, and/or the on-time of the second switch group M2 and the fourth switch group M4 is prolonged based on the on-time, so that the voltage VCF on the flying capacitor bucks, to be consistent with the ½ VIN.

It can be learned from the foregoing that, the direct current converter provided in this embodiment of this application can adjust the magnitude of the charging current in the on-time generator based on the half of the voltage on the flying capacitor and the power supply voltage, to adjust the on-time signal output by the on-time generator. On-time of four switch groups is controlled based on the on-time signal output by the on-time generator. In other words, lengths of on-time and off-time of the four switch groups are controlled. In one embodiment, charging time and discharging time of the flying capacitor are controlled, so that the voltage on the flying voltage is affected and is maintained at a half of a power supply voltage. In this way, the voltage at the switch point of the direct current converter provided in this embodiment of this application is stable, the ripple current of the inductor is reduced, and the additional loss caused by the ripple current is reduced.

During actual application, the on-time generator provided in this embodiment of this application may output two different on-time signals to control a plurality of switch groups. In addition, the on-time generator provided in this embodiment of this application may also output one on-time signal to control a plurality of switch groups. The following first uses a direct current converter including four switch groups as an example to describe an embodiment solution in which an on-time generator outputs two different on-time signals to control the four switch groups, that is, a solution of a dual on-time generator.

When the on-time generator outputs the two different on-time signals to control the four switch groups, the on-time generator may output a first on-time signal to a first switch group and output a second on-time signal to a second switch group. A conduction status of the first switch group and a conduction status of a fourth switch group complement each other, and a conduction status of the second switch group and a conduction status of a third switch group complement each other. In each switch period of the four switch groups, a sum of first on-time and second on-time is consistent, that is, basically fixed, so that fluctuation of an output voltage Vout of a three-level direct current converter can be effectively suppressed. Consistency means that in each switch period, a sum of the on-time of the first switch group (hereinafter referred to as the first on-time) and the on-time of the second switch group (hereinafter referred to as the second on-time) is within a preset time range. It should be understood that there may be an error between the sum of the first on-time and the second on-time and an ideal preset time, but the sum of the first on-time and the first on-time should be within the preset time range. The preset time range should include the ideal preset time, and the preset time range may be selected based on precision of the first on-time and the second on-time. A smaller preset time range indicates higher precision of the first on-time and the second on-time.

The sum of the first on-time and the second on-time provided in this embodiment of this application does not greatly change in each period. For ease of description, the sum of the first on-time and the second on-time is hereinafter referred to as basically fixed in the following. Therefore, in this embodiment of this application, when the voltage VCF on the flying capacitor CF is adjusted by using the first on-time and the second on-time, it is ensured that the sum of the first on-time and the second on-time is basically fixed. In other words, an increased value of the first on-time is equal to a decreased value of the second on-time, or an increased value of the second on-time is equal to a decreased value of the first on-time. Therefore, the on-time generator provided in this embodiment of this application can keep the voltage VCF on the flying capacitor CF stable at ½ VIN while reducing fluctuation of the output voltage Vout.

In addition to the on-time generator described in the foregoing embodiment, the control circuit in an embodiment of this application may further include an error amplifier, an on-time distributor, and a charging current control circuit. The following describes in detail the control circuit provided in an embodiment of this application with reference to the accompanying drawings.

Figure 6:
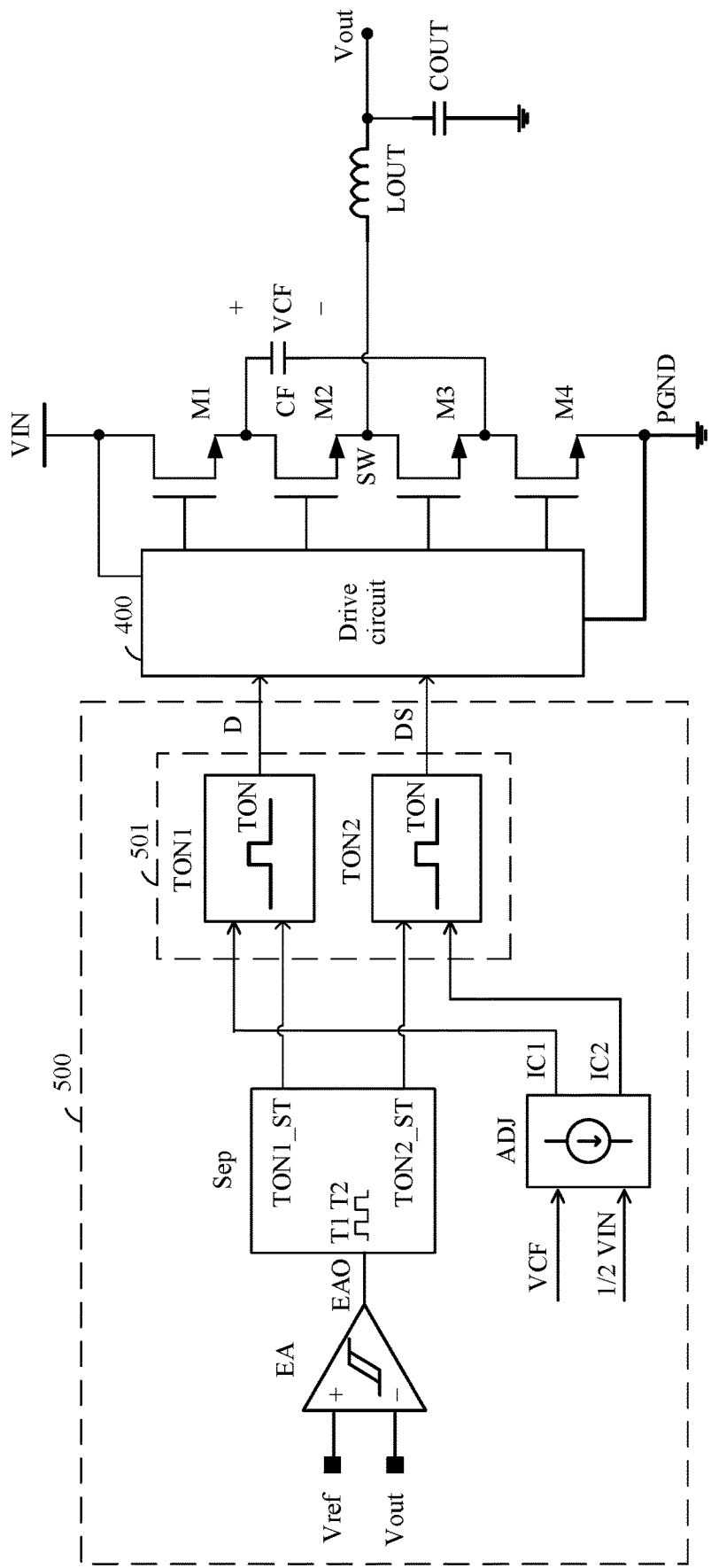
FIG. 6 is a schematic diagram of a control circuit according to an embodiment of this application.

FIG. 6 is a schematic diagram of a control circuit according to an embodiment of this application.

As shown in FIG. 6, the control circuit provided in this embodiment of this application further includes an error amplifier EA, an on-time distributor Sep, and a charging current control circuit ADJ. An on-time generator 501 includes a first on-time generator TON1 and a second on-time generator TON2.

Two input ends of the error amplifier EA are respectively connected to a preset voltage Vref and an output voltage Vout of a direct current converter, and are configured to output an error signal EAO based on a difference between the Vout and the preset voltage Vref. The preset voltage Vref may be set as required. For example, the preset voltage Vref in this embodiment of this application is set based on a load connected to an output end of the direct current converter provided in this embodiment of this application. For example, when the load connected to the output end of the direct current converter requires a 1.2 V power supply voltage, the preset voltage Vref is 1.2 V.

The on-time distributor Sep is configured to output a first enable signal TON1_ST of the first on-time generator TON1 and a second enable signal TON2_ST of the second on-time generator TON2 based on the error signal EAO.

The charging current control circuit ADJ is configured to compare a voltage VCF on a flying capacitor CF with ½ VIN, and generate a first charging current IC1 of the first on-time generator TON1 and a second charging current IC2 of the second on-time generator TON2 based on a comparison result. A sum of the first charging current IC 1 and the second charging current IC 2 is within a preset current range, so that a sum of first on-time and second on-time is within a preset time range. In this way, in this embodiment of this application, adjustment of the first charging current IC 1 and the second charging current IC 2 has small impact on the output voltage Vout.

It should be understood that, there may be a particular error between the sum of the first charging current and the second charging current and an ideal charging current, but the sum of the first charging current and the first charging current should be within the preset current range. The preset current range should include the ideal charging current, and a value of the preset current range may be selected based on precision of the first charging current and the second charging current. A smaller preset current range indicates higher precision of the first charging current and the second charging current. The sum of the first charging current and the second charging current is within the preset time range. In other words, the sum of the first charging current and the second charging current does not greatly change in each period. For ease of description, the sum of the first charging current and the second charging current is referred to as basically fixed in the following.

The error amplifier EA in this embodiment of this application outputs the error signal EAO and provides the error signal EAO to the on-time distributor Sep. The on-time distributor outputs the first enable signal to enable the first on-time generator TON1 and outputs the second enable signal to enable the second on-time generator TON2. The first on-time generator TON1 outputs a first on-time signal D to a drive circuit 400, and the second on-time generator TON2 outputs a second on-time signal DS to the drive circuit 400. The drive circuit 400 drives a first switch group M1, a second switch group M2, a third switch group M3, and a fourth switch group M4 to generate three-level output at a switch point SW. The output voltage Vout is output after a voltage of the switch point SW is filtered by an inductor LOUT and a capacitor COUT.

The first on-time signal D provided in this embodiment of this application indicates the first on-time, and the second on-time signal DS indicates the second on-time. In one embodiment, time in which the first on-time signal D is at a high level is the first on-time, and time in which the second on-time signal DS is at a high level is the second on-time.

The on-time generator provided in this embodiment of this application includes the first on-time generator TON 1 and the second on-time generator TON 2. An internal structure of the first on-time generator TON1 is basically the same as that of the on-time generator in FIG. 4. As shown in FIG. 4, the charging current IC1 of the first on-time generator TON1 provided in this embodiment of this application is equivalent to the charging current I in the foregoing embodiment. The enable signal TON1_ST of the first on-time generator TON1 provided in this embodiment of this application is equivalent to the enable signal ST in the foregoing embodiment. The first on-time signal D output by the first on-time generator TON1 provided in this embodiment of this application is equivalent to the on-time signal TON in the foregoing embodiment.

Correspondingly, an internal structure of the second on-time generator TON2 provided in this embodiment of this application is basically the same as an internal structure of the on-time generator in FIG. 4. The charging current IC2 of the second on-time generator TON2 provided in this embodiment of this application is equivalent to the charging current I in the foregoing embodiment. The enable signal TON2_ST of the second on-time generator TON2 provided in this embodiment of this application is equivalent to the enable signal ST in the foregoing embodiment. The second on-time signal DS output by the second on-time generator TON2 provided in this embodiment of this application is equivalent to the on-time signal TON in the foregoing embodiment.

The foregoing mainly describes the on-time generator provided in this embodiment of this application. The on-time distributor provided in this embodiment of this application may enable, by using an enable signal, a drive circuit to control four switch groups to change from an off state to an on state. The following describes in detail an operating principle of the on-time distributor provided in this embodiment of this application with reference to the accompanying drawings.

Figure 7:
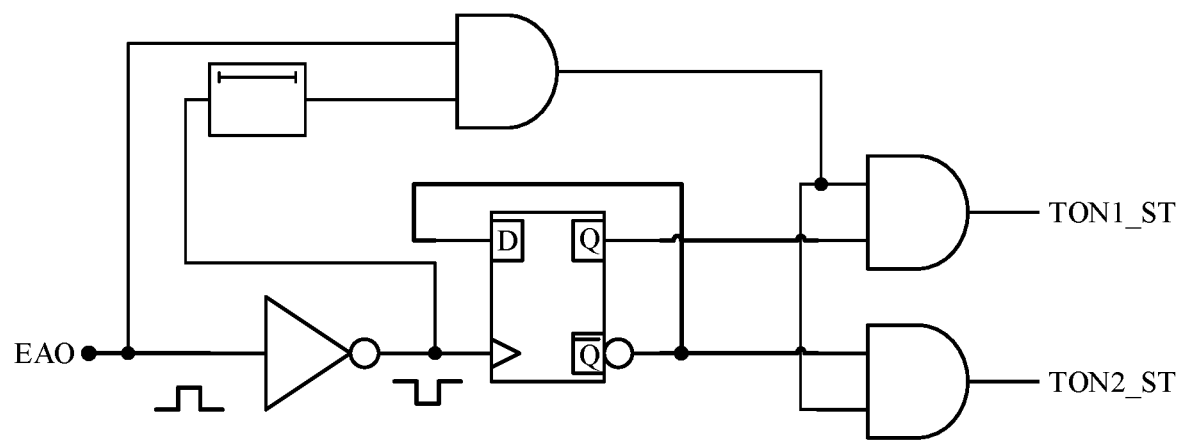
FIG. 7 is a schematic diagram of an on-time distributor according to an embodiment of this application.

FIG. 7 is a schematic diagram of an on-time distributor according to an embodiment of this application.

Figure 8:
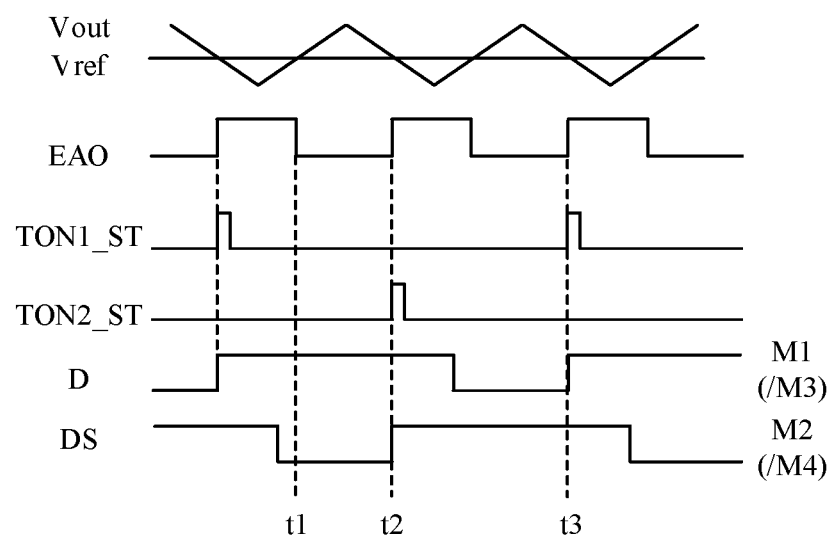
FIG. 8 is a signal waveform diagram of a control circuit according to an embodiment of this application.

FIG. 8 is a signal waveform diagram of a control circuit according to an embodiment of this application.

As shown in FIG. 7, the on-time distributor provided in this embodiment of this application receives an error signal EAO output by an error amplifier, and outputs a first enable signal TON1_ST and a second enable signal TON2_ST based on the error signal EAO. The first enable signal TON1_ST is used to enable a first on-time generator TON1, and the second enable signal TON2_ST is used to enable a second on-time generator TON2.

With reference to FIG. 4 and FIG. 8, at a time point t1, an output voltage Vout of a direct current converter changes from being lower than a preset voltage Vref to being higher than the preset voltage Vref, and the error signal EAO output by the error amplifier changes from high to low. At a time point t2, the output voltage Vout changes from being higher than the preset voltage Vref to being lower than the preset voltage Vref, the error signal EAO output by the error amplifier changes from low to high, the second enable signal TON2_ST output by the on-time distributor generates one pulse, and a second on-time signal DS output by the second on-time generator TON2 changes to a high level. In one embodiment, when a second on-time signal DS is at a high level, a drive circuit controls a second switch group M2 to be turned on and a third switch group M3 to be turned off.

At a time point t3, that is, the output voltage VOT changes from being higher than the preset voltage Vref to being lower than the preset voltage Vref again, the error signal EAO output by the error amplifier changes from low to high, the first enable signal TON1_ST output by the on-time distributor generates one pulse, and a first on-time signal D output by the first on-time generator TON1 changes to a high level. In one embodiment, when the first on-time signal D is at a high level, the drive circuit controls a first switch group M1 to be turned on and a fourth switch group M4 to be turned off.

It can be learned that the on-time separator provided in this embodiment of this application enables, by using an enable signal, a drive circuit to control conduction of four switch groups. Correspondingly, the charging current control circuit provided in this embodiment of this application is mainly configured to adjust off-time of the four switch groups by using a charging current. The following describes in detail, with reference to the accompanying drawings, an operating principle of the on-time distributor provided in this embodiment of this application.

Figure 9:
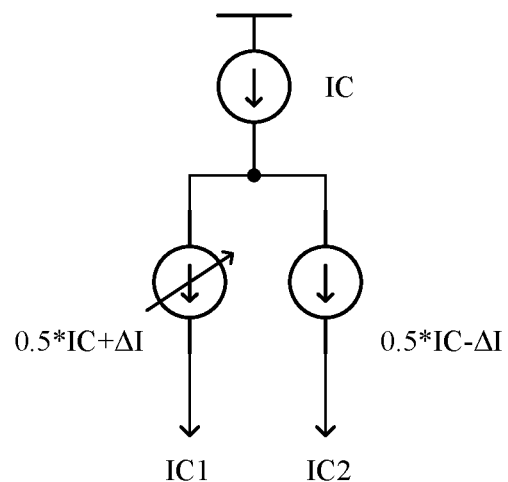
FIG. 9 is a principle diagram of a charging current control circuit according to an embodiment of this application.

FIG. 9 is a principle diagram of a charging current control circuit according to an embodiment of this application.

As shown in FIG. 9, a current IC in a charging current control circuit provided in this embodiment of this application is a sum of IC1 and IC2, and remains fixed. A first charging current IC1 output by a first output end of the charging current control circuit is 0.5*IC+ΔI, and a second charging current IC2 output by a second output end of the charging current control circuit is 0.5*IC−ΔI. In one embodiment, in the charging current control circuit provided in this embodiment of this application, an increment of the first charging current IC1 is equal to a decrement of the second charging current IC2, and a sum of the first charging current IC1 and the second charging current IC2 is equal to a constant current IC, so that a sum of first on-time and second on-time is basically fixed. In this way, in this embodiment of this application, impact on an output voltage Vout is small when a voltage VCF on a flying capacitor is adjusted. In this embodiment of this application, the sum of the first on-time and the second on-time is basically fixed, which includes: The first on-time is changed by first time, and the second on-time is reversely changed by approximate the first time.

To better understand the charging current control circuit provided in this embodiment of this application, the following describes a possible implementation of the charging current control circuit provided in this application with reference to the accompanying drawings.

Figure 10:
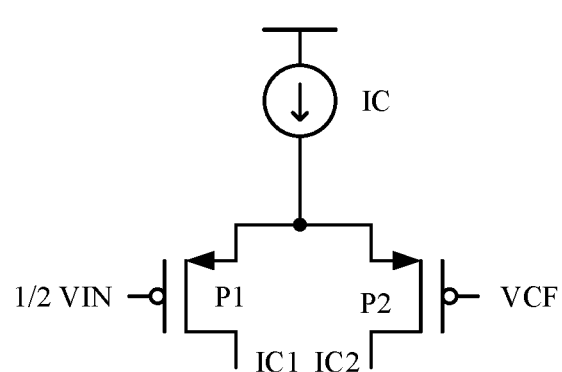
FIG. 10 is a circuit diagram of a charging current control circuit corresponding to the principle diagram of FIG. 9.

FIG. 10 is a circuit diagram of a charging current control circuit corresponding to the principle diagram of FIG. 9.

As shown in FIG. 10, the charging current control circuit provided in this embodiment of this application includes a first PMOS transistor P1 and a second PMOS transistor P2.

A source electrode of the first PMOS transistor P1 is connected to a first constant current source IC, and a source electrode of the second PMOS transistor P2 is connected to the first constant current source IC. A gate electrode of the first PMOS transistor is biased to ½ VIN, that is, ½ VIN. A gate electrode of the second PMOS transistor is biased to a voltage VCF on a flying capacitor. A drain electrode of the first PMOS transistor is a first output end of the charging current control circuit, and outputs a first charging current IC1 to a first on-time generator TON1. A drain electrode of the second PMOS transistor is a second output end of the charging current control circuit, and outputs a second charging current IC2 to a second on-time generator TON2.

It should be understood that, when the voltage VCF on the flying capacitor is greater than the ½ VIN, the first charging current IC1 becomes larger, and a voltage VC at a positive input end of a comparator AMP in the first on-time generator TON1 quickly boosts. As a result, first on-time becomes shorter, and time for turning on a first switch group M1 becomes shorter. In other words, charging time of the flying capacitor becomes shorter. Correspondingly, a second charging current IC2 becomes smaller, and the voltage VC at a positive input end of a comparator AMP in the second on-time generator TON2 slowly boosts. As a result, second on-time becomes longer, and time for turning on a second switch group M2 becomes longer. In other words, discharging time of the flying capacitor becomes longer. The charging time of the flying capacitor becomes longer, and the discharging time becomes shorter. As a result, the voltage on the flying capacitor becomes smaller, and is equal to the ½ VIN.

When the voltage VCF on the flying capacitor is less than the ½ VIN, the first charging current IC1 decreases, and the voltage VC at the positive input end of the comparator AMP in the first on-time generator TON1 slowly boosts. As a result, the first on-time becomes longer, and the time for turning on the first switch group M1 becomes longer. In other words, the charging time of the flying capacitor becomes longer. Correspondingly, the second charging current IC2 becomes larger, and the voltage VC at the positive input end of the comparator AMP in the second on-time generator TON2 quickly boosts. As a result, the second on-time becomes shorter, and the time for turning on the second switch group M2 becomes shorter. In other words, the discharging time of the flying capacitor becomes shorter. The charging time of the flying capacitor becomes shorter, and the discharging time becomes longer. As a result, the voltage on the flying capacitor becomes larger, and is equal to the ½ VIN.

In addition, because the sum of the first charging current IC1 and the second charging current IC2 is equal to a constant current IC, the sum of the first on-time and the second on-time is basically fixed. Therefore, the output voltage Vout is slightly affected in a process in which the first charging current IC1 and the second charging current IC2 change. In an actual application process, to avoid excessively frequent adjustment of the voltage VCF on the flying capacitor, when a difference between the voltage VCF on the flying capacitor and the power supply voltage VIN is less than a preset threshold, the voltage VCF on the flying capacitor may not be adjusted. The voltage VCF on the flying capacitor is adjusted only when an absolute value of the difference between the voltage VCF on the flying capacitor and the power supply voltage VIN is greater than the preset threshold.

In conclusion, the signal separator of the direct current converter provided in this embodiment of this application is connected to an error signal output by an error amplifier, directly converts the error signal into a first enable signal and a second enable signal, and outputs the first enable signal and the second enable signal to the first on-time generator and the second on-time generator, to generate the first on-time and the second on-time to control the four switch groups, thereby maintaining the voltage on the flying capacitor at the half of the power supply voltage. In this way, a voltage at a switch point of the direct current converter provided in this embodiment of this application is stable, a ripple current of an inductor is reduced, and an additional loss caused by the ripple current is reduced.

The foregoing described embodiment is implemented through a dual on-time generator. The on-time generator provided in this embodiment of this application may also output one on-time signal to control four switch groups. The following describes a solution in which the on-time generator outputs one on-time signal to control the four switch groups, that is, an embodiment solution of a single on-time generator. Because the dual on-time generator includes two on-time generators, for a solution of the dual on-time generator, duty cycles of the four switch groups may be greater than 50%. For the single on-time generator, because there is only one on-time generator, maximum duty cycles of the four switch groups only reach 50%. In other words, the duty cycles are less than or equal to 50%, and are not greater than 50%. For example, for a solution in which the duty cycles are greater than 50%, when the direct current converter is used as a buck converter, an output voltage greater than a half of an input voltage can be implemented. For example, if an input voltage is 12 V, an output voltage greater than 6 V can be implemented. However, for a solution in which the duty cycles are less than 50%, when the direct current converter is used as the buck converter, the output voltage needs to be less than or equal to 6 V.

Figure 11:
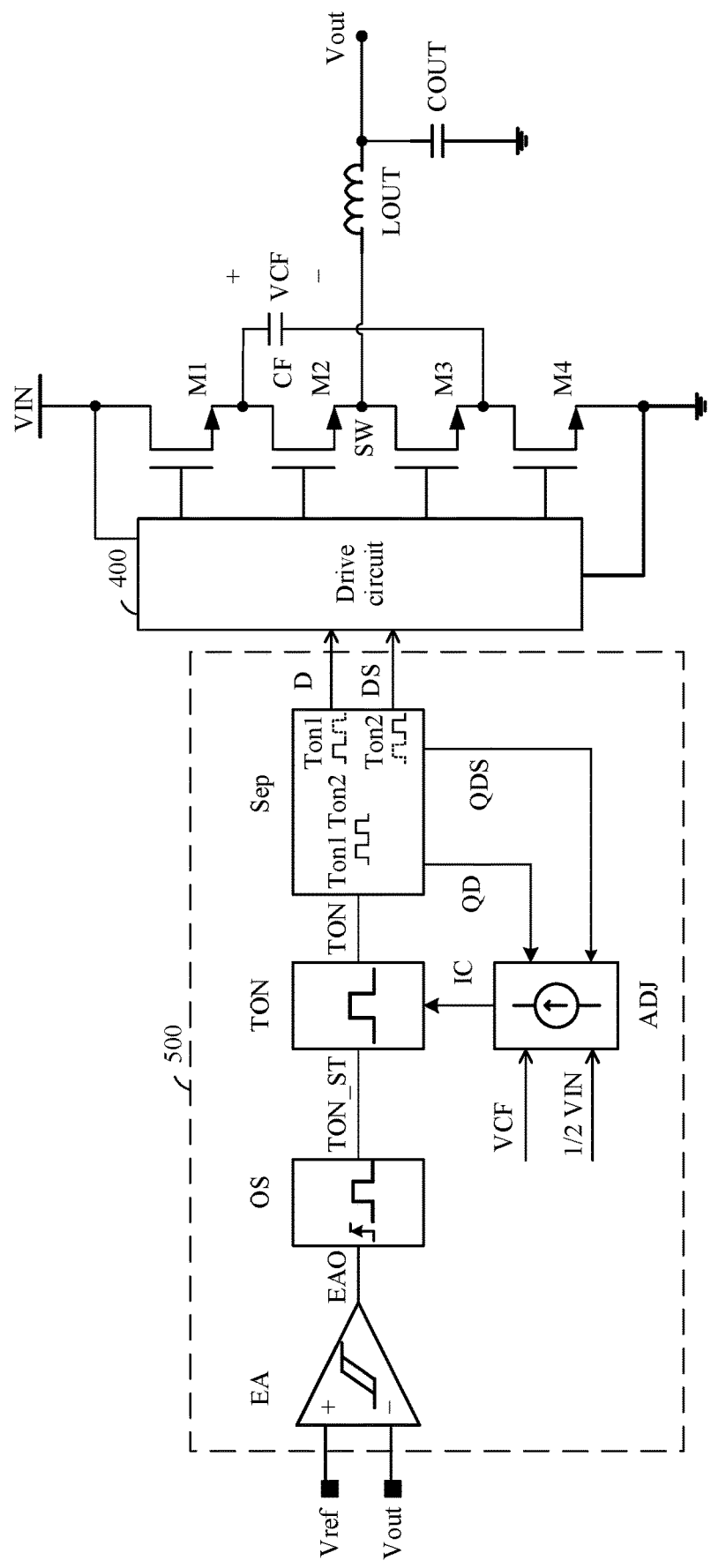
FIG. 11 is a principle diagram of a direct current converter according to an embodiment of this application.

FIG. 11 is a principle diagram of a direct current converter according to an embodiment of this application.

As shown in FIG. 11, a control circuit 500 of a direct current converter provided in this embodiment of this application includes an error amplifier EA, a pulse generator OS, an on-time generator TON, an on-time distributor Sep, and a charging current control circuit ADJ.

A first input end of the error amplifier EA is connected to a preset voltage Vref of the direct current converter. A second input end of the error amplifier EA is connected to an output voltage Vout of the direct current converter. An output end of the error amplifier EA outputs an error signal EAO to the pulse generator OS. The pulse generator OS outputs an enable signal TON_ST to the on-time generator TON based on the error signal EAO. A first input end of the charging current control circuit ADJ is connected to a voltage VCF on a flying capacitor CF, and a second input end of the charging current control circuit ADJ is connected to a half of a power supply voltage VIN, that is, ½ VIN. A third input end of the charging current control circuit ADJ is connected to a first switch signal QD output by a D flip-flop in the on-time distributor. A fourth input end of the charging current control circuit ADJ is connected to a second switch signal QDS output by the D flip-flop in the on-time distributor. An output end of the charging current control circuit ADJ outputs a charging current IC to the on-time generator.

The on-time generator TON outputs an on-time signal TON to the on-time distributor Sep based on the enable signal TON_ST and the charging current IC. The on-time distributor Sep outputs a first on-time signal D and a second on-time signal DS to a drive circuit 400 based on the on-time signal TON, to control on and off statuses of four switch groups M1 to M4, thereby adjusting charging and discharging statuses of the flying capacitor CF, so that the voltage VCF on the flying capacitor CF is consistent with the ½ VIN. The on-time signal TON indicates on-time of the four switch groups M1 to M4, the first on-time signal D indicates first on-time of the first switch group M1, and the second on-time signal DS indicates second on-time of the second switch group M2.

A function of the on-time generator TON in this embodiment of this application is basically the same as that of the on-time generator TON in the foregoing embodiment. Details are not described herein again.

The on-time distributor Sep is configured to separate the first on-time and the second on-time for the drive circuit 400 based on on-time output by the on-time generator TON, where the first on-time signal D corresponds to the first switch group M1, and the second on-time signal DS corresponds to the second switch group M2. In a continuous conduction mode, a switch status of the fourth switch group M4 and a switch status of the first switch group M1 complement each other, and a switch status of the third switch group M3 and a switch status of the second switch group M2 complement each other. A sum of the first on-time and the second on-time is within a preset time range, to suppress fluctuation of the output voltage Vout of the direct current converter. The sum of the first on-time and the second on-time does not greatly change in each period. For ease of description, the sum of the first on-time and the second on-time is hereinafter referred to as basically fixed in the following.

The error amplifier EA is configured to output the error signal EAO based on a difference between the voltage VCF on the flying capacitor CF and the preset voltage Vref.

The charging current control circuit ADJ is configured to compare the voltage VCF on the flying capacitor CF with the half of the power supply voltage VIN, and generate the charging current IC of the on-time generator TON based on a comparison result and two complementary signals (QD and QDS) output by the D flip-flop in the on-time distributor Sep.

In this embodiment of this application, the pulse generator may be implemented through a plurality of circuits. The following describes, with reference to the accompanying drawings, an implementation of the pulse generator OS provided in this embodiment of this application.

Figure 12:
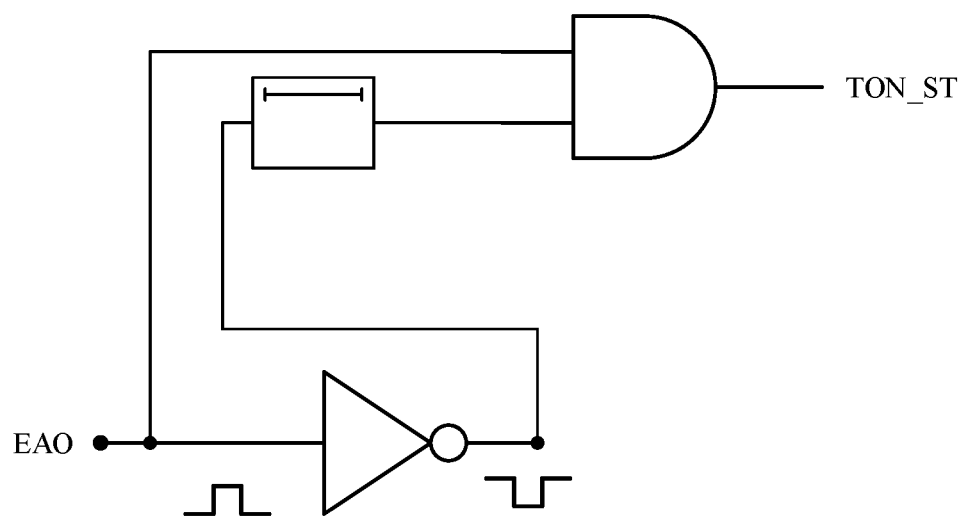
FIG. 12 is a circuit diagram of a pulse generator according to an embodiment of this application.

FIG. 12 is a circuit diagram of a pulse generator according to an embodiment of this application.

As shown in FIG. 12, an input end of the pulse generator provided in this embodiment of this application is connected to an error signal EAO output by an error amplifier EA, and outputs an enable signal TON_ST to an on-time generator TON based on the error signal EAO. A pulse generator OS is configured to generate the enable signal TON_ST based on the error signal EAO to enable the on-time generator TON.

Figure 13:
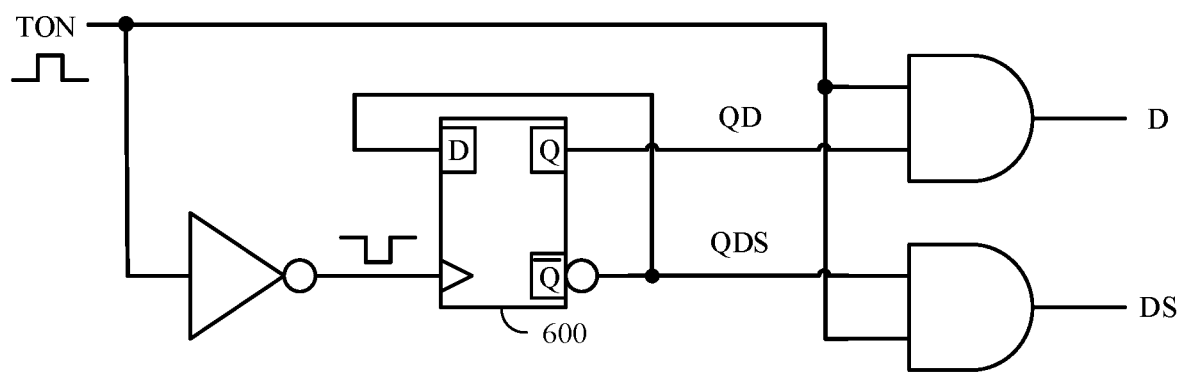
FIG. 13 is a circuit diagram of an on-time distributor according to an embodiment of this application.

The following describes the on-time distributor in this embodiment of this application with reference to FIG. 13.

FIG. 13 is a circuit diagram of an on-time distributor according to an embodiment of this application.

As shown in FIG. 13, the on-time distributor provided in this embodiment of this application includes a D flip-flop 600. A first output end of the D flip-flop 600 outputs a first switch signal QD to a charging current control circuit ADJ, and a second output end of the D flip-flop 600 outputs a second switch signal QDS to a charging current control circuit ADJ. The first switch signal QD and the second switch signal are complementary. In other words, when the first switch signal QD is at a high level, the second switch signal QDS is at a low level. When the first switch signal QD is at a low level, the second switch signal QDS is at a high level.

The on-time distributor provided in this embodiment of this application further separates the first on-time signal D and the second on-time signal DS based on an on-time signal TON output by an on-time generator TON. The first on-time signal D is used to control turn-on/off of a first switch group M1, and the second on-time signal DS is used to control turn-on/off of a second switch group M2. A period of the on-time signal is T, a waveform of the on-time signal TON in a first period T1 is the same as a waveform of the first on-time signal D in the first period T1, and a waveform of the on-time signal TON in a second period T2 is the same as a waveform of the second on-time signal DS in the second period T2. The first on-time plus the second on-time is equal to on-time.

For example, as shown by a waveform in the on-time separation Sep in FIG. 11, the waveform of the on-time signal TON in the first period T1 is Ton1, and the waveform of the on-time signal TON in the second period T2 is Ton2. A waveform of the first on-time signal D in the first period T1 is Ton1, which is the same as the waveform of the on-time signal TON in the first period T1. A waveform of the second on-time signal DS in the second period T2 is Ton2, which is the same as a waveform of the on-time signal TON in the second period T2.

It should be noted that lengths of periods of the on-time signal TON, the first on-time signal D, and the second on-time signal DS may be T. In one embodiment, a period of the on-time signal TON, a period of the first on-time signal D, and a period of the second on-time signal DS may also be 2T. When the period of the on-time signal TON, the period of the first on-time signal D, and the period of the second on-time signal DS are 2T, to avoid waveform overlapping of the on-time signal TON, duty cycles of the first on-time signal D and the second on-time signal DS are less than 50%.

Figure 14:
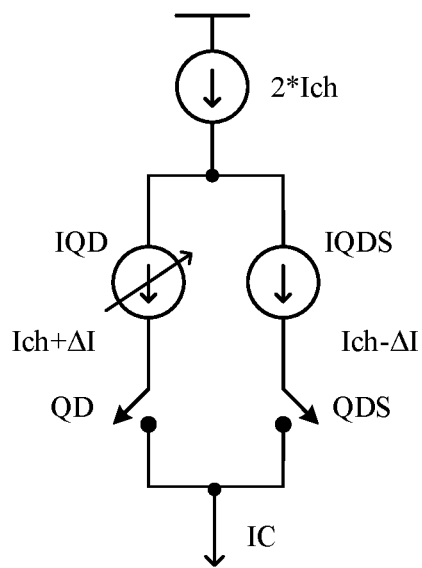
FIG. 14 is a principle diagram of a charging current control circuit according to an embodiment of this application.

The following describes a charging current control circuit in this embodiment of this application with reference to FIG. 14.

FIG. 14 is a principle diagram of a charging current control circuit according to an embodiment of this application.

As shown in FIG. 14, a first charging current IQD and a second charging current IQDS are combined into a charging current IC under control of a first current switch QD and a second current switch QDS respectively, and the IC is output to an on-time generator TON. The first current switch QD is controlled by a first switch signal QD output by an on-time distributor Sep, and the second current switch is controlled by a second switch signal QDS output by the on-time distributor Sep. Therefore, the charging current IC is equal to the first charging current IQD in a first period T1, and is equal to the second charging current IQDS in a second period T2.

Switch statuses of the first current switch QD and the second current switch QDS are opposite, that is, complementary. When the QD is on, the QDS is off. On the contrary, when the QD is off, the QDS is on.

After the first charging current IQD and the second charging current IQDS provided in this embodiment of this application are combined into the charging current IC, the charging current IC is output to the on-time generator TON. The on-time generator TON generates an on-time signal TON based on the charging current IC. The on-time distributor Sep separates the on-time signal TON into a first on-time signal D and a second on-time signal DS.

It should be understood that a process of combining the first charging current IQD and the second charging current IQDS into the charging current IC provided in this embodiment of this application and a process of separating the first on-time signal D and the second on-time signal DS from the on-time signal TON are two corresponding processes. In other words, in this embodiment of this application, when the on-time signal TON is generated based on the charging current IC, it is equivalent to that the first on-time signal D is generated based on the first charging current IQD in the first period T1, and the second on-time signal DS is generated based on the second charging current IQDS in the second period T2. In other words, the first charging current IQD corresponds to the first on-time signal D, and the second charging current IQDS corresponds to the second on-time signal DS.

A current 2*Ich in a charging current control circuit provided in this embodiment of this application is a sum of the first charging current IQD and the second charging current IQDS, and the 2*Ich remains fixed. The first charging current IQD in a first branch of the charging current control circuit is Ich+ΔI, and the second charging current IQDS in a second branch of the charging current control circuit is Ich−ΔI. In one embodiment, in the charging current control circuit provided in this embodiment of this application, a increment ΔI of the first charging current IQD is equal to a decrement ΔI of the second charging current IQDS, and a sum of the first charging current IQD and the second charging current IQDS is equal to a constant current 2*Ich, so that a sum of first on-time and second on-time is basically fixed. In this way, in this embodiment of this application, impact on an output voltage Vout is small when a voltage VCF on a flying capacitor is adjusted. In one embodiment, that the sum of the first on-time and the second on-time in this embodiment of this application is basically fixed includes: the on-time of the first switch group changes by first time, and a change of the on-time of the second switch group reversely changes by the first time. The two current branches in FIG. 14 are alternately conducted, and at a same moment, a current of only one branch is output to the IC.

FIG. 14 is merely a schematic diagram of a charging current control circuit corresponding to a single on-time generator. To better understand the charging current control circuit provided in this embodiment of this application, the following describes a possible implementation of the charging current control circuit provided in this application with reference to the accompanying drawings. It should be understood that a circuit that implements an operating principle of FIG. 14 may include a plurality of topologies. The following describes only one particular embodiment of FIG. 15.

Figure 15:
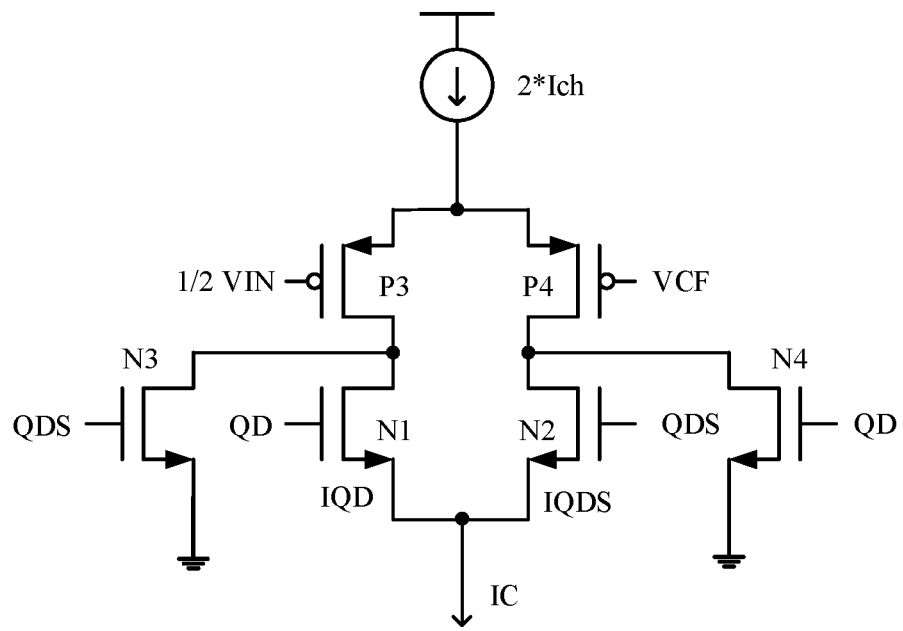
FIG. 15 is a circuit diagram of a charging current control circuit corresponding to the principle diagram of FIG. 14.

FIG. 15 is a circuit diagram of a charging current control circuit corresponding to the principle diagram of FIG. 14.

As shown in FIG. 15, the charging current control circuit provided in this embodiment of this application includes a third PMOS transistor P3, a fourth PMOS transistor P4, a first switching transistor N1, and a second switching transistor N2. In this embodiment, that both a first switching transistor and a second switching transistor are NMOS transistors is used as an example for description. In addition, the first switching transistor and the second switching transistor may also be PMOS transistors. When both the first switching transistor and the second switching transistor are PMOS transistors, a control signal is slightly different from that when the first switching transistor and the second switching transistor are NMOS transistors, and details are not described in this embodiment.

Both a source electrode of the third PMOS transistor P3 and a source electrode of the fourth PMOS transistor P4 are connected to a second constant current source 2*Ich. A gate electrode of the third PMOS transistor P3 is biased to a half of a power supply voltage VIN. A gate electrode of the fourth PMOS transistor P4 is biased to a voltage VCF on a flying capacitor CF.

A drain electrode of the third PMOS transistor P3 is connected to a first end of a first switching transistor N1, a drain electrode of the fourth PMOS transistor P4 is connected to a first end of a second switching transistor N2. A second end of the first switching transistor N1 and a second end of the second switching transistor N2 are connected together to output a charging current IC. A first output end of a D flip-flop 600 is connected to a control end of the first switching transistor N1, and a second output end of the D flip-flop 600 is connected to a control end of the second switching transistor.

When both the first switching transistor and the second switching transistor are NMOS transistors, the drain electrode of the third PMOS transistor P3 is connected to a drain electrode of the first switching transistor N1, the drain electrode of the fourth PMOS transistor P4 is connected to a drain electrode of the second switching transistor N2, and a source electrode of the first switching transistor N1 and a source electrode of the second switching transistor N2 are connected together to output the charging current IC. The first output end of the D flip-flop 600 is connected to a gate electrode of the first switching transistor N1, and the second output end of the D flip-flop 600 is connected to a gate electrode of the second switching transistor.

To enable the circuit to work more stably, as shown in FIG. 15, in one embodiment, the charging current control circuit provided in this embodiment of this application may further include a third switching transistor N3 and a fourth switching transistor N4. A first end of the third switching transistor N3 is connected to the first end of the first switching transistor N1, and a first end of the fourth switching transistor N4 is connected to the first end of the second switching transistor N2. A control end of the third switching transistor N3 is connected to a QDS. A control end of the fourth switching transistor N4 is connected to a QD. A second end of the third switching transistor N3 is grounded, and a second end of the fourth switching transistor N4 is grounded.

Because the QDS and the QD are two complementary control signals, when the third switching transistor N3 is turned on, the first switching transistor N1 is turned off. When the first switching transistor N1 is turned on, the third switching transistor N3 is turned off. Similarly, when the fourth switching transistor N4 is turned on, the second switching transistor N2 is turned off. When the second switching transistor N2 is turned on, the fourth switching transistor N4 is turned off. To better understand the solutions provided in this embodiment of this application, the following describes the control circuit in this embodiment of this application with reference to a signal waveform diagram of the control circuit provided in this embodiment of this application.

Figure 16:
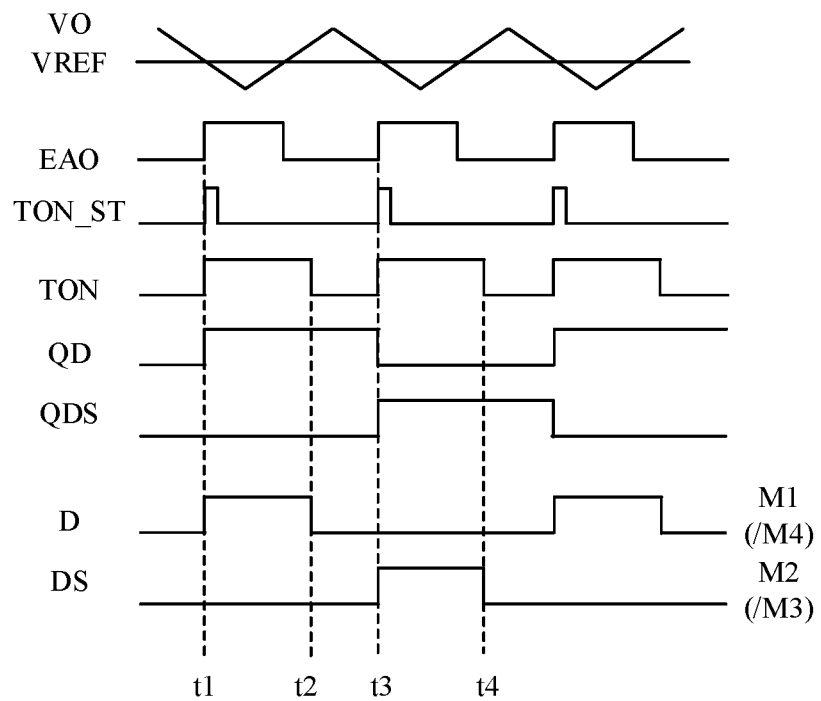
FIG. 16 is a signal waveform diagram of a control circuit according to an embodiment of this application.

FIG. 16 is a signal waveform diagram of a control circuit according to an embodiment of this application.

It can also be learned from a sequence diagram shown in FIG. 16 that drive signals of the two switches QD and QDS in FIG. 14 are complementary to each other. Therefore, switch statuses of the two switches QD and QDS may be complementary to each other.

At a time point t1, an output voltage Vout of a direct current converter changes from higher than a preset voltage Vref to lower than the preset voltage Vref. An error signal EAO output by an error amplifier changes from a low level to a high level. An enable signal TON_ST output by a pulse generator OS generates a pulse. An on-time signal TON output by an on-time generator TON changes from a low level to a high level. A first switch signal QD received by a charging current control circuit changes from a low level to a high level. A first on-time signal D output by an on-time distributor Sep changes from a low level to a high level.

At a time point t2, the on-time signal TON output by the on-time generator TON changes from a high level to a low level, and the first on-time signal D output by the on-time distributor Sep changes from a high level to a low level.

At a time point t3, the output voltage of the direct current converter changes from higher than the preset voltage Vref to lower than the preset voltage Vref again. The error signal EAO output by the error amplifier changes from a low level to a high level. The enable signal TON_ST output by the pulse generator OS generates a pulse. The on-time signal TON output by the on-time generator TON changes from a low level to a high level. The first switch signal QD received by the charging current control circuit changes from a low level to a high level. The second switch signal QDS received by the charging current control circuit changes from a low level to a high level. The second on-time signal DS output by the time separator Sep changes from a low level to a high level.

At a time point t4, the on-time signal TON output by the on-time generator TON changes from a high level to a low level, and the first on-time signal D output by the on-time distributor Sep changes from a high level to a low level.

By comparing FIG. 16 and FIG. 8, it can be seen that the duty cycles of D and DS in FIG. 16 are less than 50%, but the duty cycles of D and DS in FIG. 8 are greater than 50%. This also proves a difference between a solution of a dual on-time generator and a solution of a single on-time generator.

In conclusion, the on-time generator of the direct current converter provided in this embodiment of this application is connected to the error amplifier through a pulse generator. The on-time generator directly generates comprehensive on-time based on a signal output by the pulse generator, and outputs the comprehensive on-time to the on-time distributor. Then, the on-time distributor separates the first on-time and the second on-time based on the comprehensive on-time to control the four switch groups, to maintain the voltage on the flying capacitor at the half of the power supply voltage. In this way, a voltage at a switch point of the direct current converter provided in this embodiment of this application is stable, a ripple current of an inductor is reduced, and an additional loss caused by the ripple current is reduced.

According to the direct current converter provided in the foregoing embodiments, an embodiment of this application further provides a power system. The following describes the power system provided in this embodiment of this application with reference to the accompanying drawings.

Figure 17:
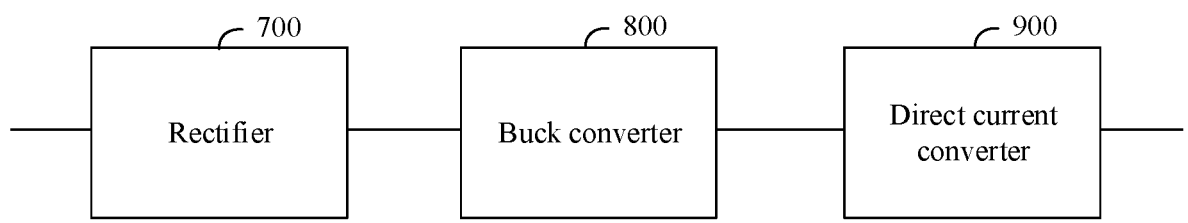
FIG. 17 is a schematic diagram of a power system according to an embodiment of this application.

FIG. 17 is a schematic diagram of a power system according to an embodiment of this application.

As shown in FIG. 17, the power system provided in this embodiment of this application includes a direct current converter 900, a rectifier 700, and a buck converter 800 described in the foregoing embodiments.

An input end of the rectifier 700 is configured to connect to an alternating current power supply, for example, a mains alternating current 220 V. An output end of the rectifier 700 is connected to an input end of the buck converter 800. An output end of the buck converter 800 is connected to an input end of the direct current converter 900. An output end of the direct current converter 900 is configured to connect to a load. In this embodiment, the buck converter 800 is used as a first-stage buck converter, and the direct current converter 900 is used as a second-stage buck converter.

In addition, the buck converter 800 in this embodiment may also be implemented by using the direct current converter 900 described in the foregoing embodiments.

The power supply system provided in this embodiment of this application includes the direct current converter provided in the foregoing embodiment. Because a voltage on a flying capacitor of the direct current converter is maintained at a half of a power supply voltage, and a voltage at a switch point of the direct current converter is stable, a ripple current of an inductor in the power supply system is small, and therefore an additional loss in the power supply system is small.

Further, because a sum of first on-time and second on-time in the direct current converter is basically a fixed value, adjustment of the voltage on the flying capacitor in the solution in this embodiment of this application has little impact on an output voltage of the direct current converter. An output voltage of the power system provided in this embodiment of this application is equivalent to an output voltage of the direct current converter. Therefore, in the solution in this embodiment of this application, when the ripple current on the inductor is reduced, impact on the output voltage of the power system is small.

The buck converter 800 provided in this embodiment of this application is configured to receive an output voltage of the rectifier 700, and buck and output the voltage to the direct current converter 900. This may be implemented by using an open-loop buck converter. The direct current converter 900 is configured to receive an output voltage of the buck converter 800, and buck and output the voltage to a load such as a chip. This may be implemented by using a closed-loop control buck converter. A voltage output by the direct current converter 900 is used to supply power to the load. Because the direct current converter 900 can implement closed-loop control, the direct current converter 900 has both a buck function and a voltage stabilization function, and an output voltage of the direct current converter 900 is stable and controllable.

In one embodiment, the rectifier 700 provided in this embodiment of this application is configured to convert a 220 V alternating current into a 48 V direct current. The buck converter 800 is configured to convert the 48 V direct current into a 12 V direct current. The direct current converter 900 is configured to continue to buck a voltage of the 12 V direct current, for example, to 5 V, 3.3 V. 1.2 V or the like to supply power to the load such as a chip.

It should be understood that the buck converter 800 provided in this embodiment of this application is only configured to buck the input voltage of 48 V to 12 V, and the output voltage of the buck converter 800 does not directly supply power to a chip or another load, but further bucks and stabilizes the voltage through the direct current converter 900. The voltage output by the direct current converter 900 is more stable and accurate, meeting a power supply requirement of the load such as the chip.

The 12 V voltage output by the buck converter 800 provided in this embodiment of this application may perform open-loop control. The output voltage is allowed to fluctuate within a certain range, as long as the input voltage range of the direct current converter 900 is met. Therefore, the first-stage buck converter 800 may be designed as an open-loop buck converter.

Correspondingly, the output voltage of the direct current converter 900 provided in this embodiment of this application needs to meet a power supply requirement of the chip or another load, and provides an accurate and stable output voltage. To ensure that the output voltage is more stable and accurate, a voltage at the output end of the direct current converter 900 may be detected and fed back to the input end of direct current converter 900, to perform closed-loop negative feedback control. In other words, the direct current converter 900 provided in this embodiment of this application may perform closed-loop control, so that a voltage at the output end of the direct current converter 900 is more stable. Therefore, the direct current converter 900 of second stage buck may be designed as a closed-loop converter.

According to the direct current converter and the power system provided in the foregoing embodiments, an embodiment of this application further provides a drive chip. The following describes the drive chip provided in an embodiment of this application with reference to the accompanying drawings.

Figure 18:
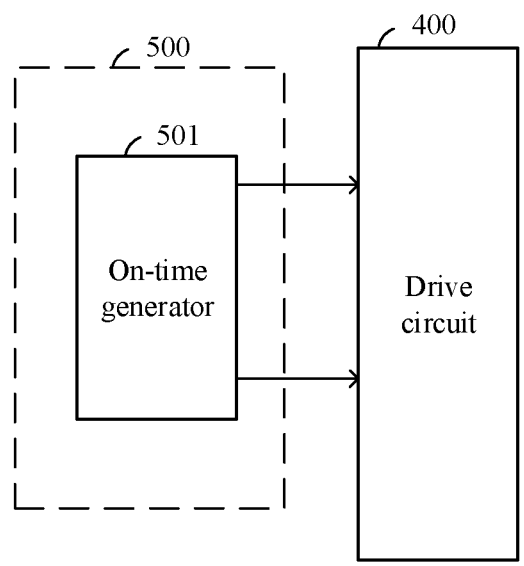
FIG. 18 is a schematic diagram of a driver chip according to an embodiment of this application.

FIG. 18 is a schematic diagram of a driver chip according to an embodiment of this application.

As shown in FIG. 18, the drive chip provided in this embodiment of this application includes a drive circuit 400 and a control circuit 500, configured to drive a three-level direct current converter. The three-level converter includes a flying capacitor and a plurality of switch groups. The control circuit 500 includes at least an on-time generator 501. The on-time generator 501 is configured to adjust an output on-time signal by changing a charging current of a capacitor of the on-time generator 501 when a voltage on the flying capacitor deviates from a half of a power supply voltage. The on-time signal is output to the drive circuit 400. The drive circuit 400 is configured to generate a drive pulse signal based on the on-time signal to drive switch statuses of the plurality of switch groups, to adjust charging time and discharging time of the flying capacitor, so that the voltage on the flying capacitor is consistent with the half of the power supply voltage.

In one embodiment, the plurality of switch groups include a first switch group, a second switch group, a third switch group, and a fourth switch group. The on-time generator is configured to output a first on-time signal to the first switch group, and is further configured to output a second on-time signal to the second switch group. In a continuous conduction mode, a switch status of the fourth switch group complements a switch status of the first switch group, and a switch status of the third switch group complements a switch status of the second switch group. In each switch period of the four switch groups, a sum of first on-time and second on-time is within a preset time range.

In one embodiment, the control circuit of this application further includes an error amplifier, an on-time distributor, and a charging current control circuit. An on-time generator control circuit includes a first on-time generator and a second on-time generator. Two input ends of the error amplifier are respectively connected to an output voltage of the direct current converter and a preset voltage, and are configured to output an error signal based on a difference between the output voltage of the direct current converter and the preset voltage. The on-time distributor is configured to output a first enable signal of the first on-time generator and a second enable signal of the second on-time generator based on the error signal. The charging current control circuit is configured to compare the voltage on the flying capacitor with the half of the power supply voltage, and generate a first charging current of the first on-time generator and a second charging current of the second on-time generator based on a comparison result. A sum of the first charging current and the second charging current is within a preset current range.

In one embodiment, the control circuit further includes an on-time distributor. The on-time distributor is configured to separate a first on-time signal and a second on-time signal for the drive circuit based on the on-time signal output by the on-time generator. The first on-time signal corresponds to the first switch group, and the second on-time signal corresponds to the second switch group. In a continuous conduction mode, a switch status of the fourth switch group complements a switch status of the first switch group, and a switch status of a third switch group complements a switch status of the second switch group. In each switch period of the four switch groups, a sum of on-time of the first switch group and on-time of the second switch group is within a preset time range.

In one embodiment, the control circuit further includes an error amplifier and a charging current control circuit. Two input ends of the error amplifier are respectively connected to an output voltage of the direct current converter and a preset voltage, and are configured to output an error signal based on a difference between the voltage on the flying capacitor and the preset voltage. The charging current control circuit is configured to compare the voltage on the flying capacitor with the half of the power supply voltage, and generate the charging current of the on-time generator based on a comparison result and two complementary signals output by a D flip-flop in the on-time distributor.

It can be learned from the foregoing that, the driver chip provided in this embodiment of this application can adjust a magnitude of a charging current in the on-time generator based on half of a voltage on a flying capacitor and a power supply voltage, to adjust on-time output by the on-time generator. On-time of four switch groups is controlled based on the on-time output by the on-time generator. In other words, lengths of on-time and off-time of the four switch groups are controlled. In one embodiment, charging time and discharging time of the flying capacitor are controlled, so that the voltage of the flying voltage is affected and is maintained at a half of a power supply voltage. In this way, a voltage at a switch point of the direct current converter provided in this embodiment of this application is stable, a ripple current of an inductor is reduced, and an additional loss caused by the ripple current is reduced.

It should be understood that in this application, "at least one (item)" refers to one or more and "a plurality of" refers to two or more. Therefore, any simple amendment, equivalent variation, and modification made on the above embodiments according to the technical essence of this application without departing from the content of the technical solutions of this application shall fall within the protection scope of the technical solutions of this application.

What is claimed is:

1. A three-level direct current converter, comprising:
a flying capacitor;
a plurality of switch groups;
a drive circuit; and
a control circuit, wherein the control circuit comprises at least an on-time generator, wherein, the on-time generator is configured to adjust an output on-time signal by changing a charging current of a capacitor of the on-time generator when a voltage on the flying capacitor deviates from a half of a power supply voltage, wherein the on-time signal is output to the drive circuit; and
the drive circuit is configured to generate a drive pulse signal based on the on-time signal to drive switch statuses of the plurality of switch groups, to adjust charging time and discharging time of the flying capacitor, so that an absolute value of a difference between the voltage on the flying capacitor and the half of the power supply voltage is less than or equal to a preset threshold.

2. The three-level direct current converter according to claim 1, wherein, the plurality of switch groups comprise: a first switch group, a second switch group, a third switch group, and a fourth switch group; wherein, the on-time generator is configured to output a first on-time signal to the first switch group, and is further configured to output a second on-time signal to the second switch group; in a continuous conduction mode, a switch status of the fourth switch group complements a switch status of the first switch group, and a switch status of the third switch group complements a switch status of the second switch group; and in each switch period of the four switch groups, a sum of on-time of the first switch group and on-time of the second switch group is within a preset time range.

3. The three-level direct current converter according to claim 2, wherein, the control circuit further comprises: an error amplifier, an on-time distributor, and a charging current control circuit, and the on-time generator comprises a first on-time generator and a second on-time generator; wherein,
two input ends of the error amplifier are respectively connected to an output voltage of the three-level direct current converter and a preset voltage, and are configured to output an error signal based on a difference between the output voltage of the three-level direct current converter and the preset voltage;
the on-time distributor is configured to output a first enable signal of the first on-time generator and a second enable signal of the second on-time generator based on the error signal; and
the charging current control circuit is configured to compare the voltage on the flying capacitor with the half of the power supply voltage, and generate a first charging current of the first on-time generator and a second charging current of the second on-time generator based on a comparison result, wherein a sum of the first charging current and the second charging current is within a preset current range.

4. The three-level direct current converter according to claim 3, wherein, the charging current control circuit comprises a first PMOS transistor and a second PMOS transistor; wherein,
a source electrode of the first PMOS transistor is connected to a first constant current source, and a source electrode of the second PMOS transistor is connected to the first constant current source;
a gate electrode of the first PMOS transistor is biased to the half of the power supply voltage, and a gate electrode of the second PMOS transistor is biased to the voltage on the flying capacitor; and
a drain electrode of the first PMOS transistor generates the first charging current and outputs the first charging current to the first on-time generator, and a drain electrode of the second PMOS transistor generates the second charging current and outputs the second charging current to the second on-time generator.

5. The three-level direct current converter according to claim 2, wherein that a sum of an on-time of the first switch group and an on-time of the second switch group is within a preset time range comprises: the on-time of the first switch group changes by a first time, and the on-time of the second switch group reversely changes by the first time.

6. The three-level direct current converter according to claim 1, wherein, the control circuit further comprises an on-time distributor; wherein,
the on-time distributor is configured to separate a first on-time signal and a second on-time signal for the drive circuit based on the on-time signal output by the on-time generator, wherein the first on-time signal corresponds to the first switch group, and the second on-time signal corresponds to the second switch group; and
in a continuous conduction mode, a switch status of the fourth switch group complements a switch status of the first switch group, and a switch status of the third switch group complements a switch status of the second switch group; and in each switch period of the four switch groups, a sum of on-time of the first switch group and on-time of the second switch group is within a preset time range.

7. The three-level direct current converter according to claim 6, wherein, the control circuit further comprises an error amplifier and a charging current control circuit; wherein
two input ends of the error amplifier are respectively connected to an output voltage of the direct current converter and a preset voltage, and are configured to output an error signal based on a difference between the output voltage of the three-level direct current converter and the preset voltage; and
the charging current control circuit is configured to compare the voltage on the flying capacitor with the half of the power supply voltage, and generate the charging current of the capacitor of the on-time generator based on a comparison result and two complementary signals output by a D flip-flop in the on-time distributor.

8. The three-level direct current converter according to claim 7, wherein, the charging current control circuit comprises a third PMOS transistor, a fourth PMOS transistor, a first switching transistor, and a second switching transistor; wherein,
both a source electrode of the third PMOS transistor and a source electrode of the fourth PMOS transistor are connected to a second constant current source, a gate electrode of the third PMOS transistor is biased to the half of the power supply voltage, and a gate electrode of the fourth PMOS transistor is biased to the voltage on the flying capacitor;

a drain electrode of the third PMOS transistor is connected to a first end of the first switching transistor, a drain electrode of the fourth PMOS transistor is connected to a first end of the second switching transistor, and a second end of the first switching transistor and a second end of the second switching transistor are connected together to output the charging current; and a first output end of the D flip-flop is connected to a control end of the first switching transistor, and a second output end of the D flip-flop is connected to a control end of the second switching transistor.

9. The three-level direct current converter according to claim 8, wherein the first switching transistor and the second switching transistor are both NMOS transistors.

10. The three-level direct current converter according to claim 1, wherein that a voltage on the flying capacitor deviates from a half of a power supply voltage comprises: the absolute value of the difference between the voltage on the flying capacitor and the half of the power supply voltage is greater than the preset threshold.

11. A power supply system, comprising:
a three-level direct current converter;
a rectifier; and
a buck converter;
wherein, the three-level direct current converter comprises a flying capacitor, a plurality of switch groups, a drive circuit, and a control circuit, wherein the control circuit comprises at least an on-time generator;
the on-time generator is configured to adjust an output on-time signal by changing a charging current of a capacitor of the on-time generator when a voltage on the flying capacitor deviates from a half of a power supply voltage, wherein the on-time signal is output to the drive circuit;
the drive circuit is configured to generate a drive pulse signal based on the on-time signal to drive switch statuses of the plurality of switch groups, to adjust charging time and discharging time of the flying capacitor, so that an absolute value of a difference between a voltage on the flying capacitor and the half of the power supply voltage is less than or equal to a preset threshold;
an input end of the rectifier is configured to connect to an alternating current power supply;
an output end of the rectifier is connected to an input end of the buck converter; and
an output end of the buck converter is connected to an input end of the three-level direct current converter.

12. The power supply system according to claim 11, wherein the buck converter is an open-loop buck converter.

13. The power supply system according to claim 11, wherein, an input voltage of the buck converter is 48 V, an output voltage of the buck converter is 12 V, and an output voltage of the three-level direct current converter supplies power to a chip.

14. The power supply system according to claim 12, wherein, an input voltage of the buck converter is 48 V, an output voltage of the buck converter is 12 V, and an output voltage of the three-level direct current converter supplies power to a chip.

15. A drive chip of a three-level direct current converter comprising:
a drive circuit; and
a control circuit configured to drive the three-level direct current converter, wherein the three-level direct current converter comprises a flying capacitor and a plurality of switch groups, and the control circuit comprises at least an on-time generator; wherein,
the on-time generator is configured to adjust an on-time signal output by the on-time generator by changing a charging current of a capacitor of the on-time generator when a voltage on the flying capacitor deviates from a half of a power supply voltage, wherein the on-time signal output is output to the drive circuit; and
the drive circuit is configured to generate a drive pulse signal based on the on-time signal output to drive switch statuses of the plurality of switch groups, to adjust charging time and discharging time of the flying capacitor, so that an absolute value of a difference between a voltage on the flying capacitor and the half of the power supply voltage is less than or equal to a preset threshold.

16. The drive chip according to claim 15, wherein1 the plurality of switch groups comprise a first switch group, a second switch group, a third switch group, and a fourth switch group; wherein, the on-time generator is configured to output a first on-time signal to the first switch group, and is further configured to output a second on-time signal to the second switch group; in a continuous conduction mode, a switch status of the fourth switch group complements a switch status of the first switch group, and a switch status of the third switch group complements a switch status of the second switch group; and in each switch period of the four switch groups, a sum of on-time of the first switch group and on-time of the second switch group is within a preset time range.

17. The drive chip according to claim 16, wherein the control circuit further comprises an error amplifier, an on-time distributor, and a charging current control circuit, and the on-time generator comprises a first on-time generator and a second on-time generator; wherein,
two input ends of the error amplifier are respectively connected to an output voltage of the three-level direct current converter and a preset voltage, and are configured to output an error signal based on a difference between the output voltage of the direct current converter and the preset voltage;
the on-time distributor is configured to output a first enable signal of the first on-time generator and a second enable signal of the second on-time generator based on the error signal; and
the charging current control circuit is configured to compare the voltage on the flying capacitor with the half of the power supply voltage, and generate a first charging current of the first on-time generator and a second charging current of the second on-time generator based on a comparison result, wherein a sum of the first charging current and the second charging current is within a preset current range.

18. The drive chip according to claim 15, wherein, the control circuit further comprises an on-time distributor; wherein,
the on-time distributor is configured to separate a first on-time signal and a second on-time signal for the drive circuit based on the on-time signal output by the on-time generator, wherein the first on-time signal corresponds to the first switch group, and the second on-time signal corresponds to the second switch group; in a continuous conduction mode, a switch status of the fourth switch group complements a switch status of the first switch group, and a switch status of a third switch group complements a switch status of the second switch group; and in each switch period of the four switch groups, a sum of on-time of the first switch group and on-time of the second switch group is within a preset time range.

19. The drive chip according to claim 18, wherein, the control circuit further comprises an error amplifier and a charging current control circuit; wherein,
two input ends of the error amplifier are respectively connected to an output voltage of the direct current converter and a preset voltage, and are configured to output an error signal based on a difference between the output voltage of the three-level direct current converter and the preset voltage; and
the charging current control circuit is configured to compare the voltage on the flying capacitor with the half of the power supply voltage, and generate the charging current of the capacitor of the on-time generator based on a comparison result and two complementary signals output by a D flip-flop in the on-time distributor.

* * * * *